United States Patent
Hirani et al.

(10) Patent No.: US 8,838,497 B2
(45) Date of Patent: Sep. 16, 2014

(54) SYSTEMS AND METHODS FOR AN ONLINE CREDIT DERIVATIVE TRADING SYSTEM

(71) Applicant: Creditex Group, Inc., New York, NY (US)

(72) Inventors: Sunil G. Hirani, New York, NY (US); Mazyar M. Dar, New York, NY (US); Chirstopher J. Crowley, London (GB)

(73) Assignee: Creditex Group, Inc., New York, NY (US)

( * ) Notice: Subject to any disclaimer, the term of this patent is extended or adjusted under 35 U.S.C. 154(b) by 1 day.

(21) Appl. No.: 14/036,356

(22) Filed: Sep. 25, 2013

(65) Prior Publication Data

US 2014/0025561 A1    Jan. 23, 2014

Related U.S. Application Data

(63) Continuation of application No. 11/882,091, filed on Jul. 30, 2007, which is a continuation-in-part of application No. 10/957,217, filed on Oct. 1, 2004, now Pat. No. 7,716,114, which is a continuation-in-part of application No. 10/316,167, filed on Dec. 9, 2002, now Pat. No. 7,587,355.

(60) Provisional application No. 60/833,848, filed on Jul. 28, 2006.

(51) Int. Cl.
*G06Q 40/00* (2012.01)
*G06Q 40/04* (2012.01)

(52) U.S. Cl.
CPC ..................... *G06Q 40/04* (2013.01)
USPC .......................................... 705/37

(58) Field of Classification Search
CPC ....................................... G06Q 40/04
USPC ............................................ 705/37
See application file for complete search history.

(56) References Cited

U.S. PATENT DOCUMENTS

| | | |
|---|---|---|
| 5,872,725 A | 2/1999 | Ninomiya et al. |
| 6,304,858 B1 | 10/2001 | Mosler et al. |
| 6,317,727 B1 | 11/2001 | May |
| 6,347,307 B1 | 2/2002 | Sandhu et al. |
| 6,363,360 B1 | 3/2002 | Madden |
| 6,377,940 B2 | 4/2002 | Tilfors et al. |
| 6,405,180 B2 | 6/2002 | Tilfors et al. |
| 6,408,282 B1 | 6/2002 | Buist |
| 6,421,653 B1 | 7/2002 | May |
| 6,505,174 B1 | 1/2003 | Keiser |
| 6,560,580 B1 | 5/2003 | Fraser et al. |
| 6,618,707 B1 | 9/2003 | Gary |
| 6,725,201 B2 | 4/2004 | Joao |
| 6,996,540 B1 | 2/2006 | May |
| 7,177,833 B1 | 2/2007 | Marynowski et al. |

(Continued)

OTHER PUBLICATIONS

Willa E. Gibson (1999), "Are Swap Agreements Securities or Futures?: The Inadequacies of Applying the Traditional Regulatory Approach to OTC Derivatives Transactions," University of Iowa, vol. 24, Section II.E, 54 pages.

(Continued)

*Primary Examiner* — Eric T Wong
(74) *Attorney, Agent, or Firm* — DLA Piper LLP (US)

(57) ABSTRACT

A credit derivative trading system comprises a credit derivative authority configured to receive defined positions for credit derivatives and update a plurality of trade clients in real-time whenever there is movement in the market for a particular credit derivative.

8 Claims, 24 Drawing Sheets

ITraxx Europe — 1102

| Buyer | Buy | Sell | Seller |
|---|---|---|---|
| 1 | 25MM | 50MM | 1 |
| 2 | 50MM | 50MM | 2 |
| 3 | 25MM | 25MM | 3 |
| 4 | 100MM | | |

Tickets — 1104

Buyer 1 x Seller 3 in 25MM
Buyer 2 x Seller 1 in 50MM
Buyer 3 x Seller 2 in 25MM
Buyer 4 x Seller 2 in 25MM

(56) References Cited

U.S. PATENT DOCUMENTS

| | | |
|---|---|---|
| 7,212,997 B1 | 5/2007 | Pine et al |
| 7,251,629 B1 | 7/2007 | Marynowski et al. |
| 7,333,950 B2 | 2/2008 | Shidler et al. |
| 7,392,214 B1 | 6/2008 | Fraser et al. |
| 2001/0056393 A1 | 12/2001 | Tilfors et al. |
| 2002/0042765 A1 | 4/2002 | Dawson |
| 2002/0052822 A1 | 5/2002 | Terashima |
| 2002/0055897 A1 | 5/2002 | Shidler et al. |
| 2002/0116314 A1 | 8/2002 | Spencer et al. |
| 2002/0116317 A1 | 8/2002 | May |
| 2002/0194107 A1 | 12/2002 | Li et al. |
| 2003/0018561 A1 | 1/2003 | Kitchen et al. |
| 2003/0083978 A1 | 5/2003 | Brouwer |
| 2003/0115129 A1 | 6/2003 | Feaver et al. |
| 2004/0024692 A1 | 2/2004 | Turbeville |
| 2004/0111355 A1 | 6/2004 | Hirani et al. |
| 2004/0162862 A1 | 8/2004 | Hull et al. |
| 2004/0236636 A1 | 11/2004 | Lutnick et al. |
| 2005/0097029 A1 | 5/2005 | Cooper |
| 2005/0149426 A1 | 7/2005 | Jokisch et al. |
| 2005/0149428 A1 | 7/2005 | Gooch et al. |
| 2005/0216393 A1 | 9/2005 | Lutnick et al. |
| 2006/0036535 A1 | 2/2006 | Hirani et al. |
| 2006/0059078 A1 | 3/2006 | Courbois et al. |
| 2006/0143099 A1 | 6/2006 | Partlow et al. |
| 2006/0242061 A1 | 10/2006 | Axilrod |
| 2006/0293996 A1 | 12/2006 | Lutnick et al. |

OTHER PUBLICATIONS

Decovny, Sherree, "A Chip Off the Old Block," Q2 2006, Market View Magazine, pp. 6-7.

Exchange Watch, "Nasdaq Readies New Data Feeds and Network," Jan. 21, 2002, Inside Market Data, vol. 17, No. 16.

Securities and Exchange Commission Release No. 34-5068; File No. SR-NASD-2004-101, Jul. 23, 2004.

Harris, Larry, "Order Exposure in Cantor Fitzgerald's Government Bond Trading System," Trading and Exchanges: Market Microstructure Practitioners. Oxford University Press US, 2003, ISBN 0195144708, 9780195144703, p. 531 (Reference Best Available Copy as provided by for the USPTO in the Office Action dated Sep. 19, 2008 in U.S. Appl. No. 11/882,091).

BBA—British Banker's Association, "The BBA LIBOR Fixing and Definition," Nov. 7, 2002.

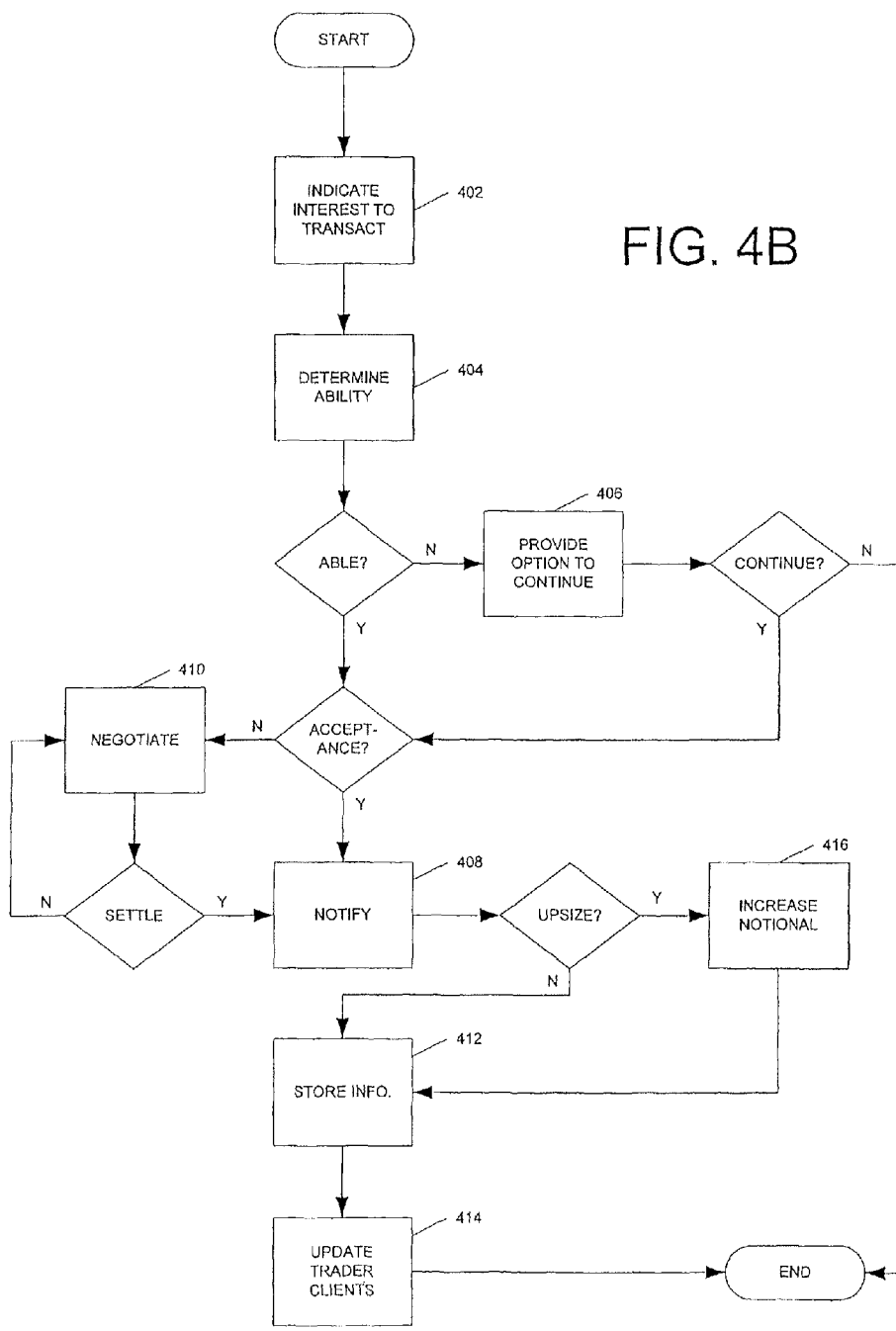

ITraxx Europe — 1102

| Buyer | Buy | Sell | Seller |
|---|---|---|---|
| 1 | 25MM | 50MM | 1 |
| 2 | 50MM | 50MM | 2 |
| 3 | 25MM | 25MM | 3 |
| 4 | 100MM | | |

Tickets — 1104

Buyer 1 x Seller 3 in 25MM
Buyer 2 x Seller 1 in 50MM
Buyer 3 x Seller 2 in 25MM
Buyer 4 x Seller 2 in 25MM

Tradeable Credit Spread Fixing

*Tradeable Credit Spread Fixings*  Guidelines

The Volume Clearing period is in process. Enter your orders before time expires.

Closed  Cancel All  1204  1206  1208  1210  1212  1214  1216  1218

| Credit | My Market | | | Fixing | | Volume Clearing | | My Trades | |
|---|---|---|---|---|---|---|---|---|---|
| | Size | Bid | Offer | Mid | Dirs | Buy | Sell | Bought | Sold |
| DJ iTraxx 5y | | | | | | | | | |
| Europe | 25MM | 32 | 33 | 31.25 | 9 | 50MM | | 75MM | |
| HiVol | 25MM | 52 | 54 | 53.75 | 9 | 75MM | | | |
| Crossover | 10MM | 231 | 235 | 235.25 | 8 | | 40MM | | 30MM |

DJ iTraxx Europe 5y

| Methodology | Bid | Mid | Offer |
|---|---|---|---|
| Basic | 31.25 | 31.25 | 31.5 |
| Trades Capped | 30.75 | 31.25 | 31.81 |
| Trades Excluded | 30.2 | 31.25 | 32.1 |

FIG. 12C tradeable credit spread fixings

Fixings posted at 11:00am on Friday, September 24, 2004.

Fixings Results

| | Bid | Mid | Offer | Dealers | Fixings Volume | Total Traded Volume Clearing |
|---|---|---|---|---|---|---|
| EUROPE | 37.417 | 37.604 | 37.792 | 11 | 0MM | 50MM |
| HIVOL | 61.542 | 61.854 | 62.167 | 12 | 0MM | 50MM |
| CROSSOVER | 288 | 289.9 | 291.8 | 10 | 0MM | 20MM |

** Trades completed were revised to 2 decimal places.

iTraxx 5yr Series 2

All prices contributed to the fixings.

Europe

| Queue | Bids | Offers |
|---|---|---|
| 1 | 37.5 | 37.75 |
| 2 | 37.5 | 37.75 |
| 3 | 37.5 | 37.75 |
| 4 | 37.5 | 37.75 |
| 5 | 37.25 | 37.75 |
| 6 | 37.25 | 38 |
| 7 | 37.25 | 38 |
| 8 | 37 | 38 |
| 9 | 37 | 38 |
| 10 | 36.75 | 38.25 |
| 11 | 36.75 | 38.5 |
| 12 | | |

HiVol

| Queue | Bids | Offers |
|---|---|---|
| 1 | 61.75 | 62 |
| 2 | 61.75 | 62 |
| 3 | 61.5 | 62 |
| 4 | 61.5 | 62.25 |
| 5 | 61.5 | 62.25 |
| 6 | 61.25 | 62.5 |
| 7 | 61 | 62.5 |
| 8 | 61 | 62.5 |
| 9 | 61 | 62.75 |
| 10 | 61 | 63 |
| 11 | 61 | 63 |
| 12 | 60.5 | |

Crossover

| Queue | Bids | Offers |
|---|---|---|
| 1 | 290 | 291 |
| 2 | 288 | 292 |
| 3 | 288 | 292 |
| 4 | 287 | 292 |
| 5 | 287 | 292 |
| 6 | 287 | 293 |
| 7 | 286 | 294 |
| 8 | 286 | 295 |
| 9 | 285 | 295 |
| 10 | 284 | 298 |

FIG. 15A

FIG. 18
View for client without access to Large Ticket Markets
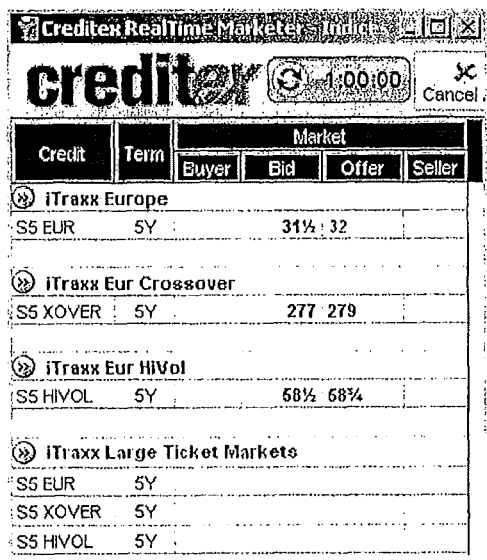
View for Client with access to large ticket markets
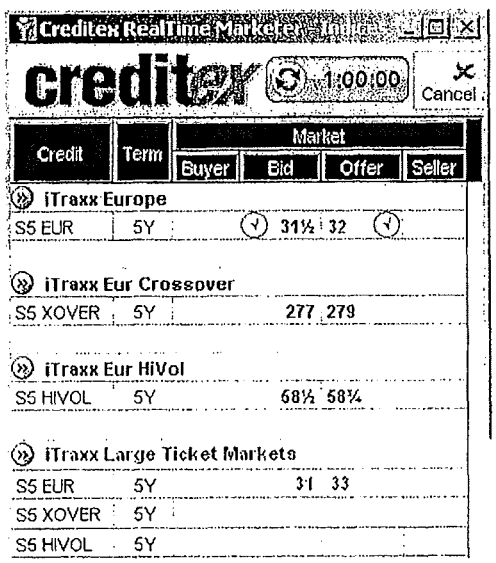

SYSTEMS AND METHODS FOR AN ONLINE CREDIT DERIVATIVE TRADING SYSTEM

FIELD OF THE INVENTION

The field of the invention relates generally to credit derivatives and more particularly to the transacting in credit derivatives in an online environment.

BACKGROUND OF THE INVENTION

Currently, conventional credit derivative markets comprise a user base of larger institutions. These large institutions use the credit derivative markets for a variety of reasons. For example, commercial banks, both domestic and foreign, can obtain significant economic, regulatory, and capital relief from selling credit risk in a credit derivative market. Commercial banks can also use the credit derivative markets to add credit risk to their portfolios as an alternative to the lending market. Insurers, which typically poses excellent credit evaluation skills, primarily use the credit derivative markets to take on credit risk for a premium. Investment management companies and Hedge Funds, or other investors, use the credit derivative markets to both take on and shed risk.

The dealer community represents some of the largest financial intermediaries in the world. The dealers tend to be large, multi-national institutions that make markets in credit derivatives. The scale and scope of each dealer's credit derivative business varies widely, with some dealers having extensive credit derivative operations, and other being occasional market participants. Thus, in conventional credit derivative markets, information flow is concentrated in a few dealers. Generally, the end users, such as those described above, transact through the dealers and not directly with each other. Often, information is scarce and incomplete as it relates to the buyers and dealers participating in the market, as is information concerning price and the risk associated with particular derivatives.

Dealers transact with other dealers via a broker market. A broker is an intermediary that transacts business between dealers. The brokers do not principal risk. Generally, information dissemination from the brokers is very inefficient. Further, the brokers business is limited to the dealers, because there is no meaningful contact between the brokers and end uses.

There are other drawbacks to conventional credit derivative markets. One such draw back is that conventional credit derivative markets tend to be regionalized, e.g., with individual markets being localized by continent and/or time zones. For example, the U.S. credit derivative market tends to trade strictly in U.S. credit risk, while the European credit derivative market usually trades in European credit risk. Due to the manual and labor intensive nature of conventional credit derivative markets, it is very difficult for dealers to break down the localized nature of conventional credit derivative markets.

Another drawback is the high cost to transact in a conventional credit derivative market. Each dealer in a conventional credit derivative market tends to employ large intermediary infrastructure to facilitate the transactions. The size of the infrastructure leads to large transaction costs, which will remain as long as conventional credit derivative markets remain regionalized and controlled by just a few dealers. Further, because information is concentrated in the hands of a few large participants, conventional credit derivative markets are inefficient and illiquid. The illiquidity persists because for many of the largest participants, their only transactional outlet is through the dealers. Traditionally, another drawback is operational inefficiency that results from a lack of standardized documentation. The operational inefficiency is made worse by the fact that the documentation processes involved tend to be manual processes, which is also in part due to the lack of standardization.

Another drawback that will be mentioned here is the inefficient, fragmented, and disjointed distribution mechanisms of conventional credit derivative markets. When a market participant wants to transact, they will call one of a few dealers to ask for a price. Dealers usually will go through a broker at this point. Alternatively, the dealer will often call a limited number of other possible participants to determine if they are willing to transact. If the dealer determines that they are likely to find a willing participant at an acceptable spread, then the dealer will likely try to consummate the transaction, e.g., using a broker. Frequently, however, multiple dealers are calling the same potential participants trying to determine a willingness to transact. As a result, potential transactions are often selected out of the market because participants have few outlets, the dealer feels that the fee to consummate the transaction is too low, and/or the dealer will not principal the risk because they fear they will not be able to find a willing participant on the other side of the transaction. Consequently, while a few participants benefit from the economic inefficiencies of conventional credit derivative markets, many do not.

Another difficulty in trading credit derivatives occurs when a dealer or buyer desires to trade a large number of credit derivatives. A desire for a large transaction can influence the market in a manner adverse to the trader.

SUMMARY OF THE INVENTION

A credit derivative trading system comprises a credit derivative authority configured to receive defined positions for credit derivatives and update a plurality of trade clients in real-time whenever there is movement in the market for a particular credit derivative.

In another aspect of the invention, the credit derivative trading system comprises a standardized interface that allows trade clients to view information on credit derivatives in a compact and uniform format. The standardized interface also allows the trader clients to interface with the credit derivative authority in quick and efficient manner.

In another aspect of the invention, the credit derivative trading system is configured to allow trade clients who have already agreed on a trade to increase the notional amount of the trade anonymously.

In another aspect of the invention, the credit derivative trading system is configured to allow invited participants to trade a credit derivative at a fixed price once that credit derivative has been traded in a related transaction.

These and other features, aspects, and embodiments of the invention are described below in the section entitled "Detailed Description of the Invention."

BRIEF DESCRIPTION OF THE DRAWINGS

Features, aspects, and embodiments of the inventions are described in conjunction with the attached drawings, in which:

FIGS. 4A and 4B are flow charts illustrating an example method of receiving an indication of a willingness to transact within the system of FIG. 1 in accordance with one embodiment of the invention;

FIG. 5A is a screen shot illustrating a display of credit derivative information within on a terminal included in the system of FIG. 1 in accordance with one embodiment of the invention;

FIG. 6 is a screen shot illustrating the display of historical credit derivative information on a terminal included in the system of FIG. 1 in accordance with one embodiment of the invention;

FIG. 11 is a chart that illustrates an example of volume upsizing;

FIG. 12A is a screen shot of an example of how a participant can be solicited for bids and offers;

FIG. 12B is a screen shot of an example of how a participant can perform volume clearing;

FIG. 12C is a screen shot illustrating the results of the volume clearing session;

FIGS. 15A, 15B, 15C, and 15D are printouts of actual results of a fixed price trading session related to each of the three credits.

FIG. 18 is a screen shot for a participant who has large ticket status and a screen shot for a participant who does not have large ticket status.

DETAILED DESCRIPTION OF THE INVENTION

Figure 1:
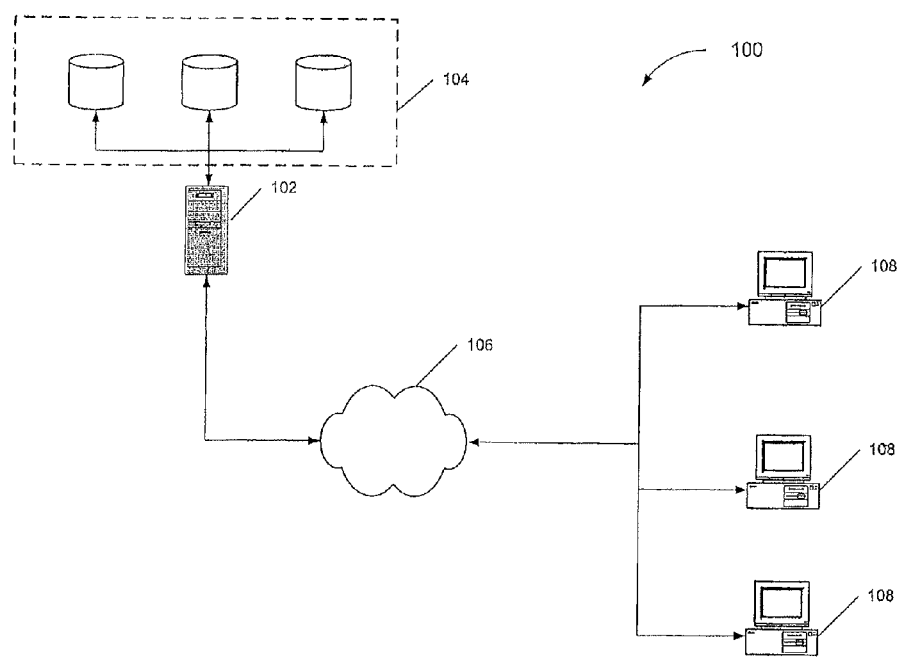
FIG. 1 is a diagram illustrating an example credit derivative trading system in accordance with one embodiment of the invention.

FIG. 1 is a diagram illustrating an example credit derivative trading system 100 in accordance with one embodiment of the systems and methods described herein. System 100 comprises a credit derivative authority 102 interfaced with a database 104. Database 104 can, as illustrated, actually comprise a plurality of databases depending on the embodiment. Credit derivative authority 102 is interfaced with a plurality of trader clients via terminals 108 through network 106.

In one embodiment, network 106 is the Internet; however, network 106 can be any type of wired or wireless Wide Area Network, wired or wireless Local Area Network, or even a wired or wireless Personal Area Network, or some combination thereof. Further, in certain embodiments credit derivative authority 102 and/or terminals 108 can be interfaced with network 106 via wired and/or wireless communication links, while in another embodiment, credit derivative authority 102 and/or terminals 108 are interfaced with network 106 via wired communication links.

In one embodiment, terminals 108 are computer terminals, such as desktop or laptop computers. In other embodiments, terminals 108 are handheld devices, such as handheld computers or personal digital assistants. It will be apparent, however, that terminals 108 can be any type of terminal configured to include the functionality required by the systems and methods described herein.

The term "authority" used to identify credit derivative authority 102 is intended to indicate that terminals 108 communicate with credit derivative authority 102 through the computing systems, hardware and software, associated with credit derivative authority 102. Thus, depending on the embodiment the term authority can refer to one or more servers, such as Internet or web servers, file servers, and/or database servers, one or more routers, one or more databases, one or more software applications, one or more Application Program Interfaces (APIs), or some combination thereof. Further, the computing system associated with credit derivative authority 102 can include one or more computers or computer terminals. To that extent, some of the same components that comprise the computer system associated with credit derivative authority 102 can also comprise terminals 108. An exemplary embodiment of a computer system that can comprise credit derivative authority 102 is described in more detail with respect to FIG. 7.

System 100 includes a standardize interface that allows the trader clients to define positions with credit derivative authority 102 for any of a plurality of credit derivatives regardless of the region, industry, etc. Credit derivative authority 102 is configured to then store the positions in database 104. Using the standardized interface, credit derivative authority 102 displays information related to the positions stored in database 104 to the trader clients via terminals 108. The trader clients are then able to define responsive positions, indicate a willingness to transact, and/or complete a transaction using the standardized interface. Thus, credit derivative authority 102 can replace the dealer-broker paradigm of conventional credit derivative markets and provides the trader clients with more outlets, greater liquidity, and more efficiency, all of which can help to lower transactional costs.

The standardized interface can comprise software components configured to run on credit derivative authority 102 as well as client software components configured to run on terminals 108. Thus, credit derivative authority 102 can work in conjunction with the client software running on terminals 108 to format and display information to the trader clients in a uniform manner and to receive input from the trader clients through terminals 108 in a manner that allows quick, easy, and efficient transactions. Certain features and aspects of the standardized interface are discussed more fully below.

Figure 2:
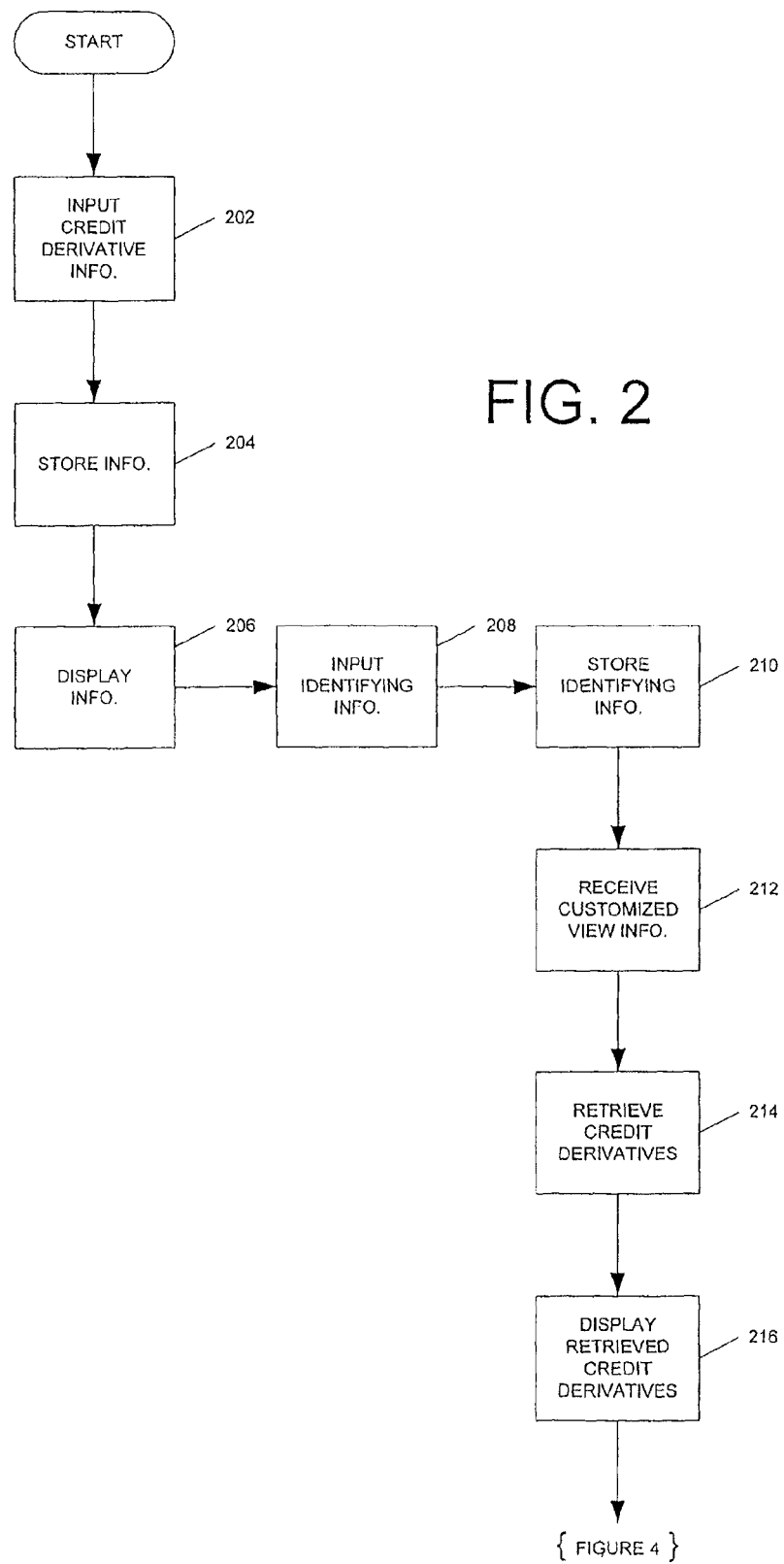
FIG. 2 is a flow chart illustrating an example method for transacting in a credit derivative in the system of FIG. 1 in accordance with one embodiment of the invention.

FIG. 2 is a flow chart illustrating an example method of transacting in credit derivatives using system 100 in accordance with the systems and methods described herein. First, in step 202, credit derivative authority 102 receives information related to a reference entity's credit risk that is available for transaction. In other words, when a trader client wants to move credit risk in a certain reference entity, the trader client can access credit derivative authority 102 and make the information available along with an ask price.

In step 204, credit derivative authority saves the information in database 104 and in step 206, credit derivative authority 102 causes the information to be displayed to the rest of the plurality of trader clients via their terminals 108. Because the trader clients can access credit derivative authority 102 from anywhere in the world, the credit derivatives made available by credit derivative authority 102 are not limited by region or industry. Thus, the previously fragmented nature of credit derivative markets can be addressed. Moreover, credit derivative authority 102 is preferably configured to cause the information to be displayed in a compact and uniform manner to all of the trader clients regardless of the type of credit derivative. Moreover, credit derivative authority is preferably configured to update trader clients in real-time as new credit derivatives are defined within system 100.

As an example of the compact and uniform display of information, credit derivative authority 102 is configured, in certain embodiments, to display the following for each credit derivative defined in system 100: a reference entity name, scheduled termination of the credit derivative, a debt level, a bid price, an ask price, a reference obligation, and a restructuring level. In other embodiments, credit derivative authority can also be configured to display the associated currency, a debt rating, and a debt type for each of the positions defined in system 100. Credit derivative authority 102 is configured, for example, to display the information using the standardized interface described above. Thus, credit derivative authority 102 retrieves the relevant information from database 104 and transmits it to a client application, or applications, running on terminals 108. The client applications then display the information in accordance with the systems and methods described herein.

Figure 5A:
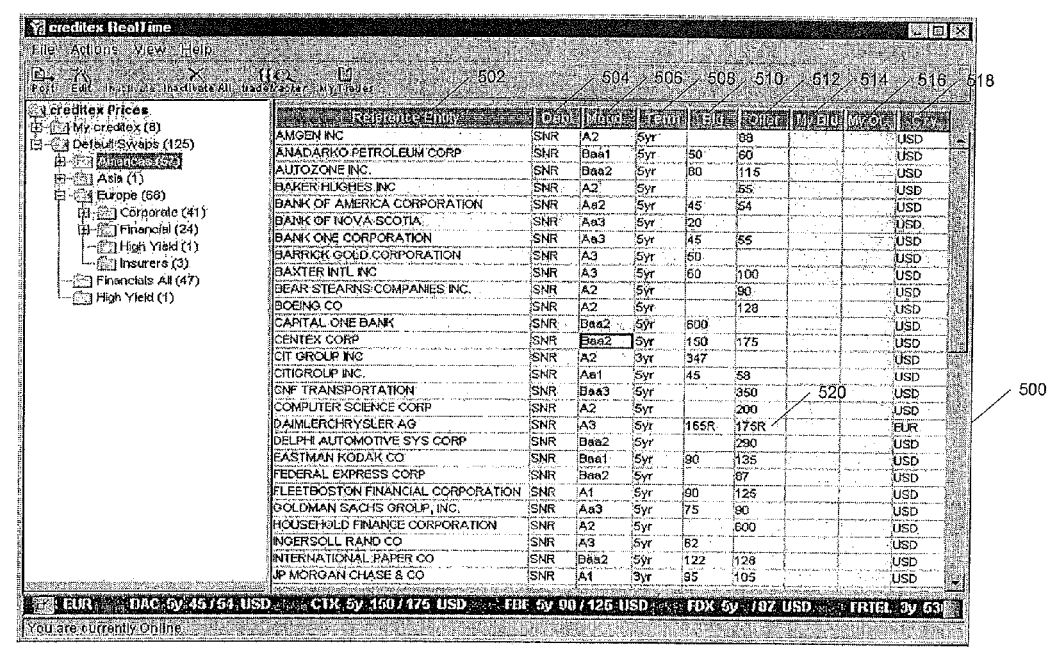

FIG. 5A is a screen shot illustrating one example method of displaying the information on terminals 108 using a compact and uniform format. Thus, the display screen 500 includes a plurality of columns 502-518. As can be seen, column 502 comprises the names of various reference entities for which credit derivatives have been made available in system 100. Column 504 comprises the debt type associated with each reference entity in column 502. Column 506 comprises a debt rating associated with each reference entity in column 502. Although, as mentioned above, this column may or may not be included depending on the embodiment. Column 508 comprises the scheduled termination associated with the credit derivative for the reference entity in column 502. Column 512 includes the associated ask prices, while column 510 includes responsive bids. Thus, once bids are received, the information can be displayed in column 510. Columns 514 and 516, included in certain embodiments, comprise the bid and/or ask prices associated with the particular trader client on whose terminal 108 display 500 is being displayed. Finally, column 518 comprises the associated currency.

Figure 5B:
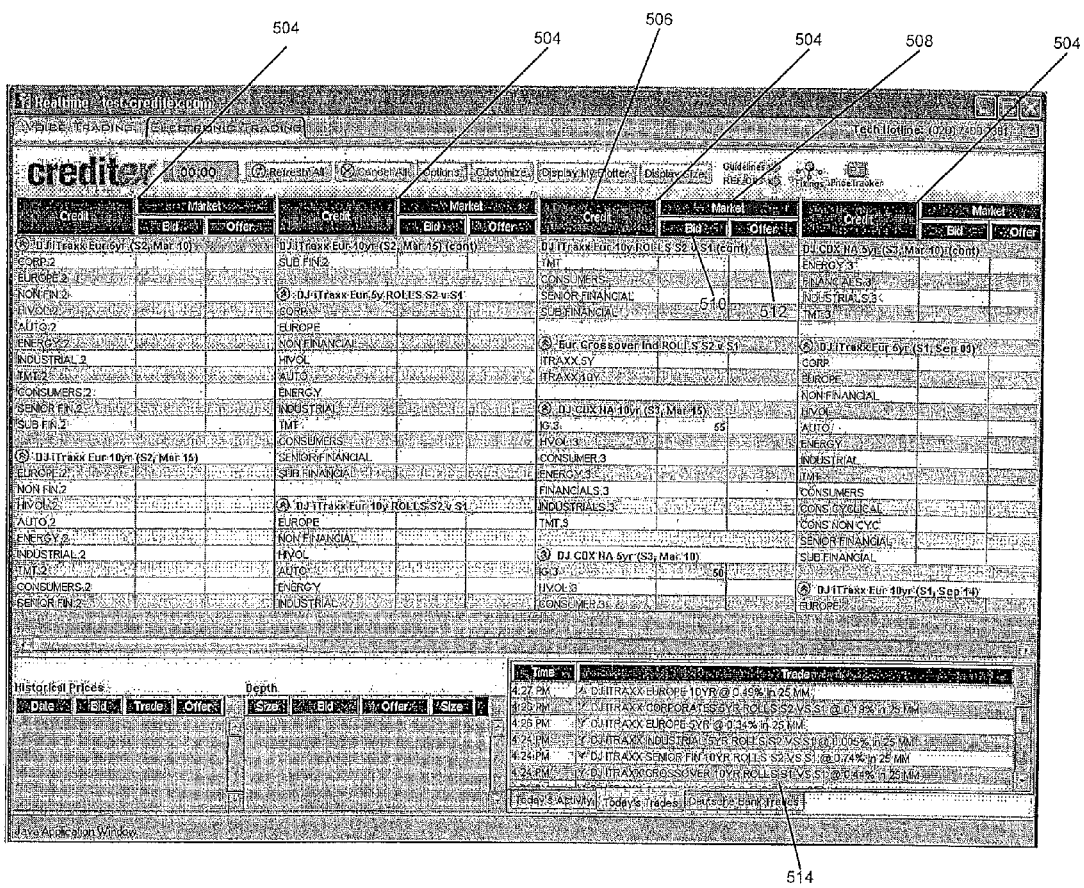
FIG. 5B is a screen shot illustrating a display of credit derivative information within on a terminal included in the system of FIG. 1 in accordance with another embodiment of the invention.

FIG. 5B is a diagram illustrating another example method of displaying the information on terminals 108 using a compact and uniform format. As can be seen, the screen shot of FIG. 5B includes several columns 504 that include information about credit derivatives that can be traded. In addition to the names and other information related to the credit derivatives, each column 504 include a column 508 that includes market information. In this example, the market information simply includes a bid column 510 and an offer column 512. The display can also include a window 514 that includes information related to recent trades.

Once the information for a new credit derivative is displayed in step 206, then bids can start to be received by credit derivative authority 102. This process is described below in relation to FIG. 3. Since the credit derivative market is a bilateral market, however, certain trader clients may not wish to deal with certain other trader clients in all, or certain, situations. Thus, in certain embodiments, credit derivative authority 102 is configured to receive information identifying trader clients with whom the trader client defining the new position is willing to transact, i.e., the trader client uses the standardized interface to provide identifying information to credit derivative authority 102 that identifies other trader clients with whom the trader client is willing to transact. Depending on the embodiment, the information includes the names of certain trader clients or defining characteristics of acceptable trader clients. Credit derivative authority 102 stores the identifying information in database 104 in step 210. The information is then used, as described below, in certain embodiments, by credit derivative authority 102 to help facilitate transaction between trader clients.

It should be noted that in certain embodiments, trader clients do not need to provide, or review, credit risk information related to the various trader clients. For example, in some embodiments, use of system 100 can be restricted to larger clients, or clients that are prescreened for credit risk.

In certain embodiments, the trader clients can customize their view of the information displayed. Thus, for example, in step 212 credit derivative authority 102 receives, from a trader client, information defining the customized view requirements of a trader client, i.e., using the standardized interface, a trader client inputs information defining a customized view. For example, in one embodiment, a trader client specifies certain regions of interest in step 212. Then, in step 214, credit derivative authority 102 retrieves from database 104 credit derivatives only for the indicated regions. These credit derivatives are then displayed, in step 216, on the trader client's terminal 108. Alternatively, a trader-client can customize the trader client's view by specifying, in step 212, certain industries, certain reference entity names, certain credit duration, certain debt levels, certain spreads, i.e., the difference between the ask and bid prices, certain restructuring levels, etc., that the trader client is interested in. In an alternative embodiment, the credit derivatives can be sorted by geographic areas and/or sectors. Thus, a trader client can, in such embodiments, specify the area and/or sector of interest in step 212. In step 214 credit derivative authority 102 retrieves information for credit derivatives that meet the criteria input by the trader client.

In a process similar to view customization, trader clients can also preferably indicate certain alternative views that they are interested in. For example, in one embodiment, instead of indicating factors that define credit derivatives of interest, the trader client indicates, in step 212, an interest in certain historical information. Examples of historical information indicated in step 212 include, the historical spread information for a certain credit derivative, historical trades for the trader client, and historical transactions for a certain credit derivative. In certain embodiments, a relevant time period of interest is also indicated in step 212. Historical information conforming to the input criteria is then retrieved in step 214 and displayed in step 216.

Figure 6:
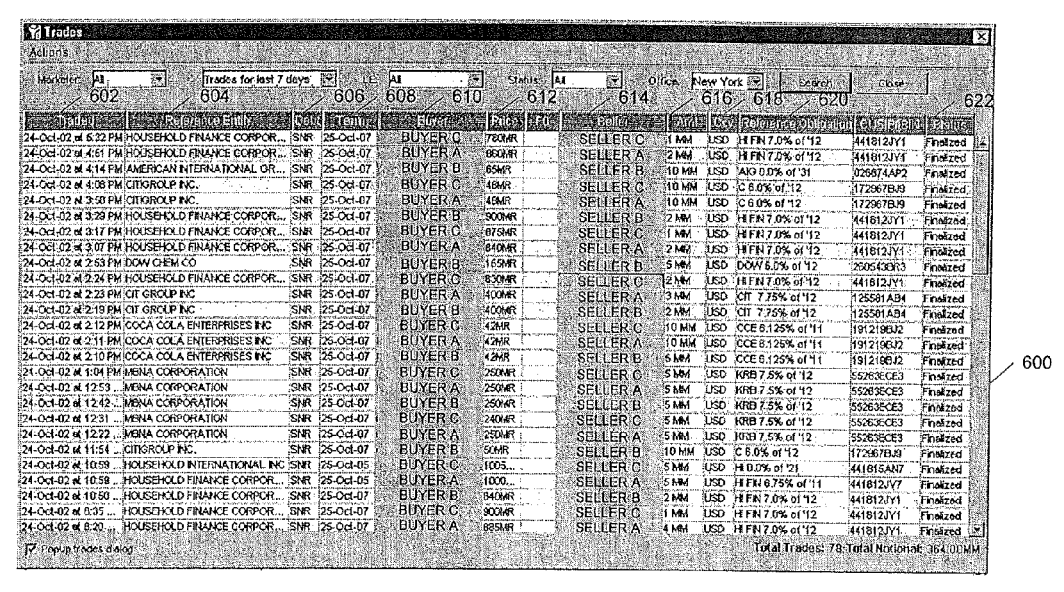

For example, FIG. 6 is a screen shot illustrating a display 600 of historical transactions for a certain credit derivatives. As can be seen, display 600 includes columns 602-614. Column 602 comprises the date of the associated transaction, column 604 comprises the name of the reference entity involved, column 606 comprises the type of debt, column 608 comprises the scheduled termination of the credit derivative, column 610 comprises the identity of the buyer, column 612 comprises the price, column 614 comprises the name of the seller, column 616 comprises the notional amount of the transaction, column 618 comprises the associated currency, column 620 comprise the reference obligation, and column 622 comprise the status of the transaction. Of course, depending on the embodiment, some of the columns illustrated in FIG. 6 are not included in display 600.

Figure 3:
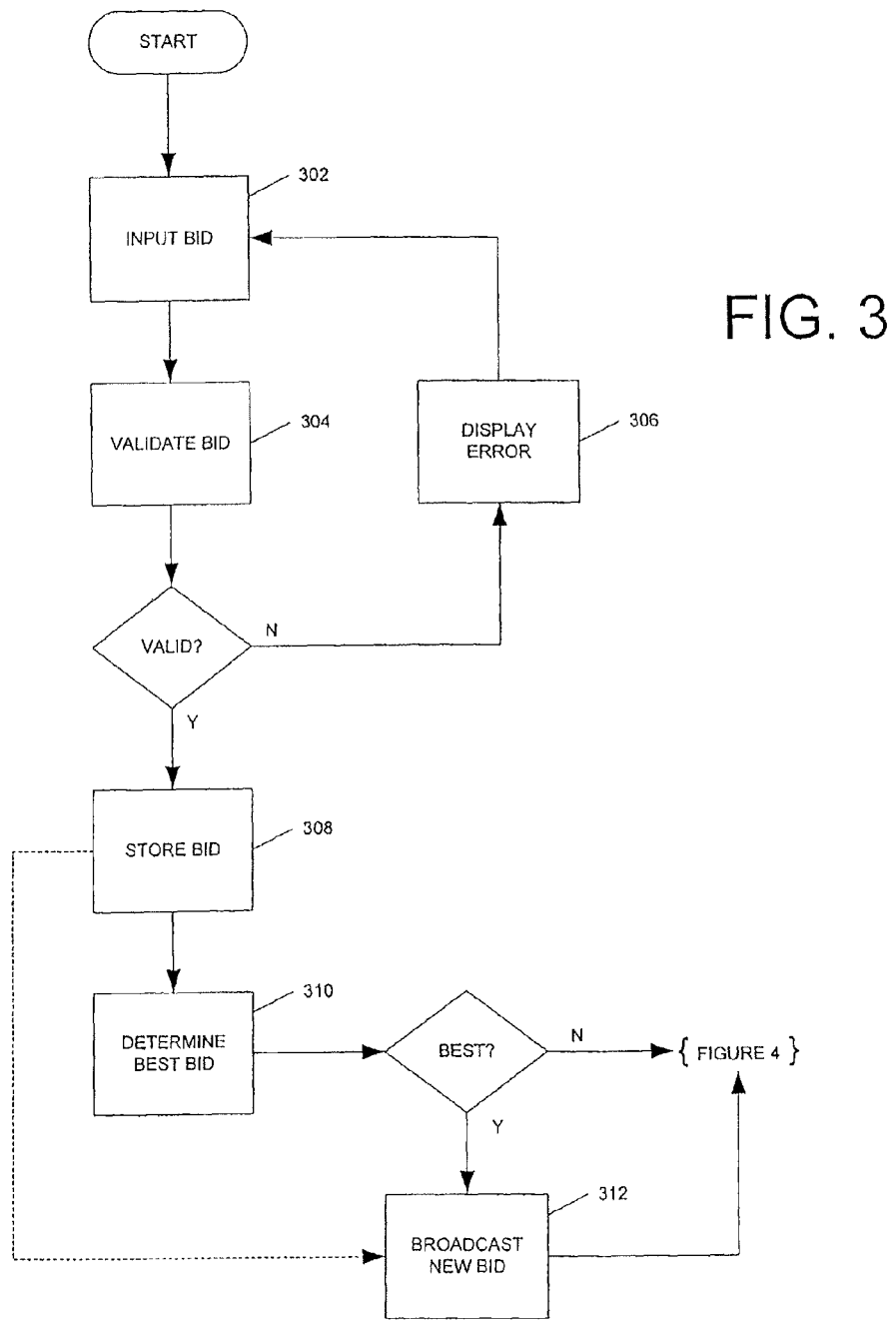
FIG. 3 is a flow chart illustrating an example method of receiving a responsive position within the system of FIG. 1 in accordance with one embodiment of the invention.

FIG. 3 is a flow chart illustrating an example process by which a responsive position is received and handled in real-time by system 100. The example processes of FIG. 3 assume that the original position defined was an ask and, therefore, the responsive position is a bid. But the process is largely the same for the reverse situation as well. It should be noted that in certain embodiments, the time a bid or offer remains valid should be specified when the bid or offer is made. Additionally, in certain embodiments, a notional of the price should be specified.

The process begins in step 302, when a trader client inputs a bid, e.g., through their standardized interface, in response to a recent ask. In step 304, credit derivative authority 102 validates the bid, e.g., checks to ensure that the bid specifies a valid credit derivative. If the bid is not valid, then credit derivative authority 102 causes an error message to be displayed on the trader client's terminal 108 and allows the trader client to input another bid (step 302). If the bid is valid, then credit derivative authority 102 stores, in step 308, the bid information. 1

In one embodiment, credit creative authority 102 then checks the bid against information stored in database 104 to determine if the bid is the best bid. In other words, credit derivative authority 102 checks bid information stored in database 104 to determine if the bid is the highest bid for the associated credit derivative. If the bid is the best bid, then in step 312, credit derivative authority 102 updates all the trader clients with the new bid information. The update that occurs in step 312 is essentially in real-time. Thus, the trader clients are receiving updated information as the credit derivative market moves. Conversely, if the position defined in step 302 is an ask, then credit derivative authority 102 determines, in step 310, whether the ask is lower than the previous ask and updates the trader clients, in step 312, when it is determined that the ask is the lowest ask.

In certain embodiments, the latest ask or bid is broadcast to all trader clients regardless of whether it is the best. This allows the trader clients to see depth in the market.

Figure 4A:
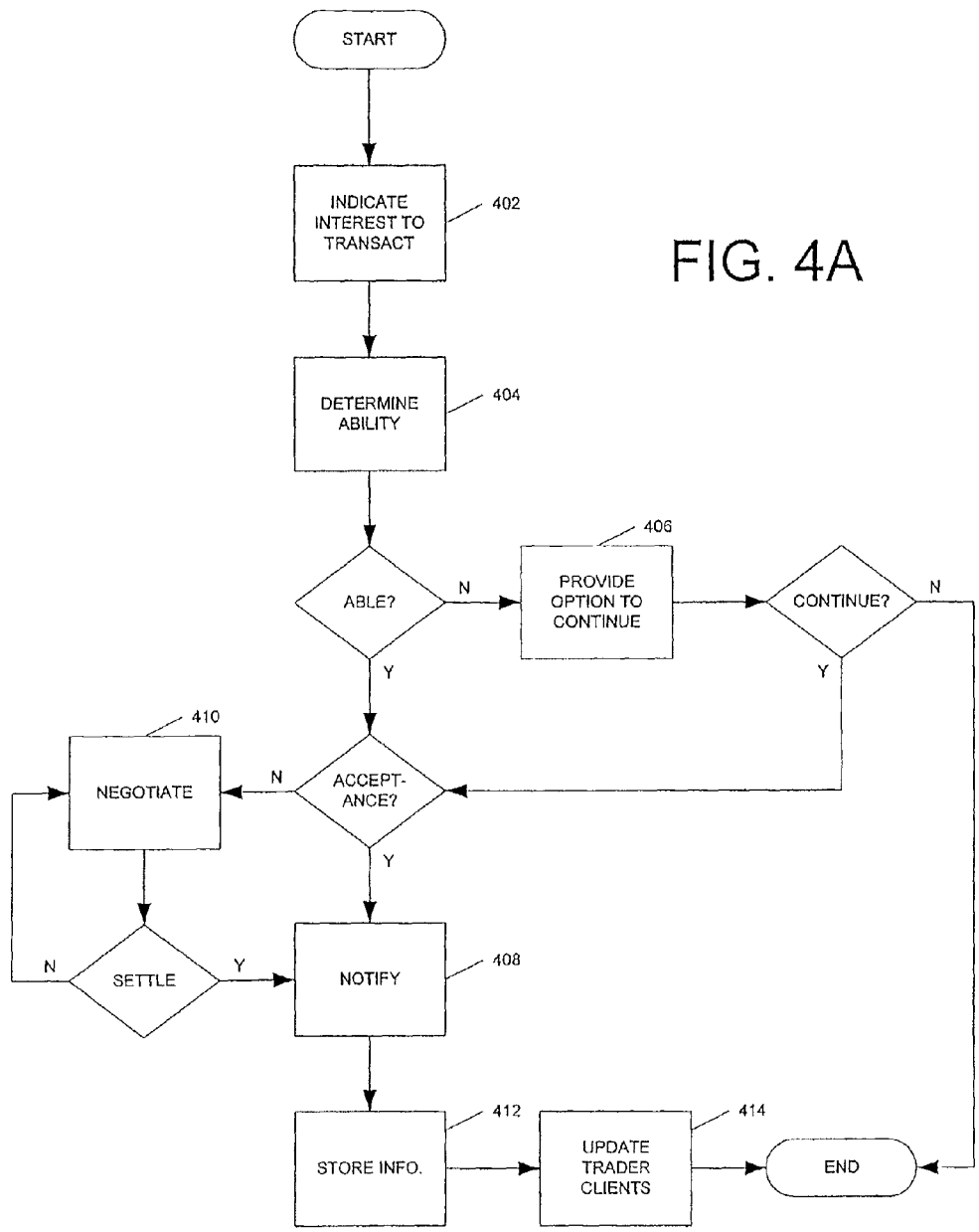

FIG. 4 is a flow chart illustrating an example process for engaging in a transaction within system 100. The process begins in step 402 with a trader client indicating a desire to transact in response to a received updated position (step 312). For example, the trader client uses their standardized interface to indicate a desire to transact. In one embodiment, when credit derivative authority 102 receives the indication, it determines the ability of the trader client to transact on the associated credit derivative. This is where the information provided in step 208 can come into play if required. Thus, in step 404, credit derivative authority 102 determines, based on information stored in database 104, whether the trader client indicating a desire to transact is acceptable to the other party.

In one embodiment, if credit derivative authority determines that the trader client is not acceptable, then in step 406 credit derivative authority 102 presents the other party with the option to proceed. If the other party declines, then the transaction is not consummated. If, on the other hand, the other party is willing to continue, or if it is determined in step 404 that the trader client is able to transact, then the transaction proceeds.

The trader client can indicate a willingness to transact in step 402, by indicating a willingness to accept the terms associated with the new position or by indicating a willingness to negotiate with the other party. If the indication in step 402 is an acceptance, then the other party is notified of the acceptance in step 408 by credit derivative authority 102. If the indication of step 402 is of a willingness to negotiate, then the parties negotiate with each other in step 410. As will be described in more detail below, the parties can negotiate aided by the standardized interface and credit derivative authority 102. In an alternative embodiment, once the trader client indicates a willingness to transact in step 402, they call, or are contacted by, a broker associated with credit derivative authority 102 to negotiate and settle the transaction. In certain embodiments, direct negotiation as just described is not supported.

Once the transaction settles, all of the information associated with the transaction is stored by credit derivative authority 102 into database 104 in real-time, i.e., the information is stored as it passes back and forth between the parties and between the parties and credit derivative authority 102. Credit derivative authority 102 then updates the information displayed to the trader clients, again in real-time, in step 414, based on the transaction information.

In another embodiment, upon the settlement of the transaction, the trader can be prompted as to whether the trader desires to upsize the trade, that is, increase the notional amount of the trade. At this point both parties are given a chance to request a trade of a larger notional amount, before knowing who their trading partner is. Upon determination of the largest notional amount agreed upon by both parties, the trade is completed at this notional amount.

This can be beneficial when a trader desires to trade a notional amount that is greater than the standard or default amount. Generally, traders are hesitant to make an intention to trade more than the standard or default amount known, because this can result in a lower price for the credit derivative. Thus, if a default trade amount is 10 million shares and a trader desires to trade 30 million shares, the trader will often simply attempt to make three trades. With the volume upsizing process described above, and in more detail below, a trader desiring to trade a large notional amount of a credit derivative can trade that notional amount without making the market aware of his intention, thereby maintaining the value of his credit derivative.

Figure 8:
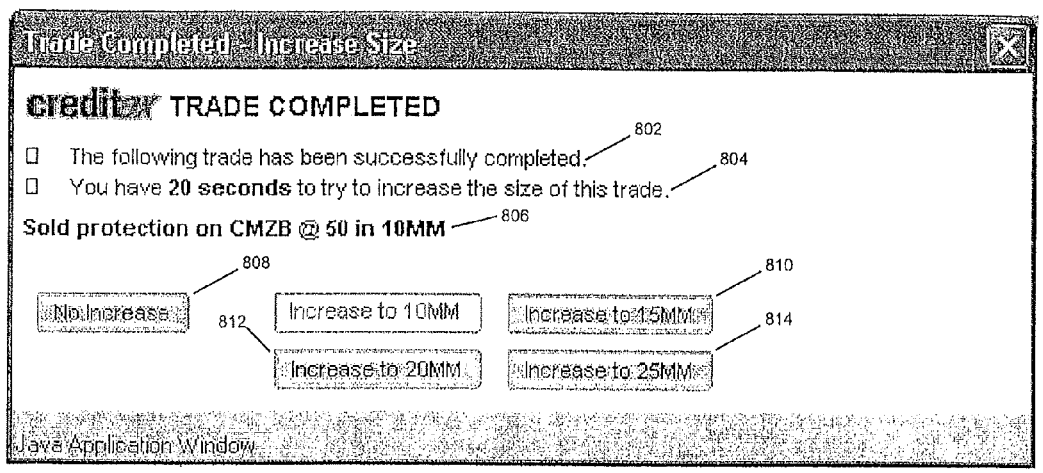
FIG. 8 is a screen shot illustrating an example method of displaying a request to upsize a trade.

FIG. 8 is a screen shot illustrating an example method of displaying a request to upsize a trade. Field 802 indicates that the original trade is completed in the notional amount shown at filed 806. In this particular embodiment, the trader is given a predetermined interval of time to respond to the upsize prompt, which in this case is 20 seconds as shown at field 804. The trader can then elect to increase the trade to a higher notional amount by activating buttons 810, 812, or 814 depending on the size of the increase desired, or the trader can indicate no desired to increase by activating button 808. If both parties agree, the trade is upsized to that notional amount. In another embodiment, the prompting to upsize can repeat until one of the two trading parties no longer wishes to upsize at which point the largest amount agreed upon by both parties can be traded. In another embodiment, if the two parties both upsize but not to the same notional amount, the smaller of the two amounts can be taken as the agreed notional amount.

In another embodiment, a price can be fixed by the system and invited participants can place orders to buy or sell the credit derivative at the fixed price in a manner similar to the volume clearing described above. There are many methods by which the system can fix a price. For example, the system can solicit and accept a number of bids and offers from its participants. These bids and offers in addition to the asking and selling price can also include a volume to be traded. In one embodiment, the bids and offers can be made binding to prevent participants from entering false bids in order to influence the market. Furthermore, to prevent participants from unduly influencing the market, a participant whose bid price is met, that is the bid price is at least that of the fixed price can be prohibited from selling during the volume clearing. Likewise, a participant whose offer price is met, that is the offer price is at most that of the fixed price can be prohibited from buying during the volume clearing. Based on these bids and offers the system can select a fixed price.

Figures 12A, 12B:
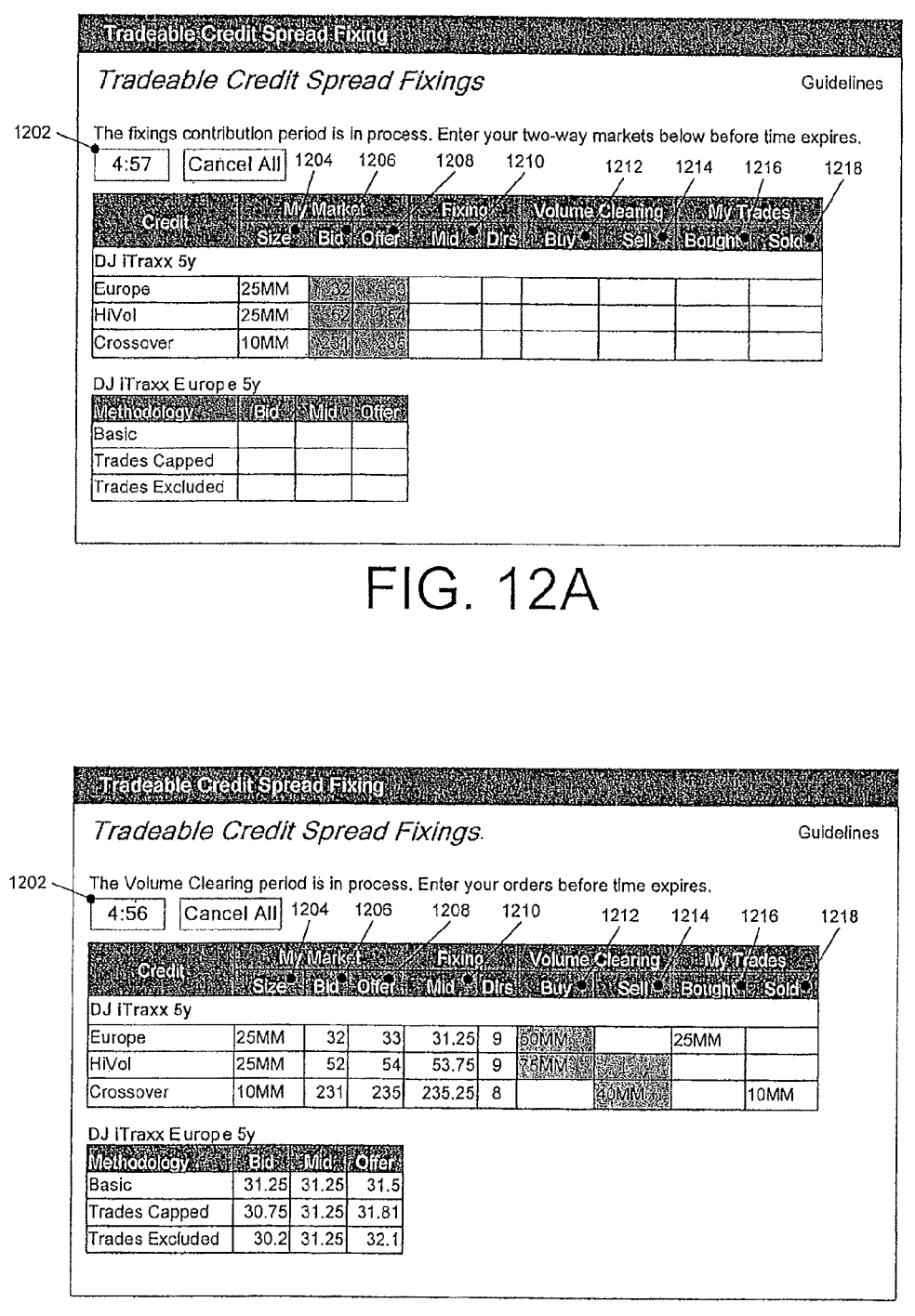

FIG. 12A is a screen shot of an example of how a participant can be solicited for bids and offers. In the depicted example, when the system solicits bids and offers, a predetermined time limit is imposed after which bids and offers are no longer accepted. The amount of time remaining to enter a bit is shown in field 1202. In column 1204, the notional amount of the bid/offer is shown. In this example, the volume is fixed for all participants, in other embodiments, this amount can be entered by the participant. In column, 1206, the bid prices are entered by the participant for each credit derivative and in column 1208, the offer prices are entered by the participant. The system can also safeguard against choice prices, that is a bid equal to an offer, and inverted prices, that is a bid greater than an offer. Once the time limit has expired, all valid submissions by the participants are collected by the system and a fixed price is determined.

FIG. 12B is a screen shot of an example of how a participant can perform volume clearing. Once again the amount of time remaining to change the order is shown in field 1202. Column 1210 shows the fixed price for each of the credit derivatives. If the participant's bid price is greater than or equal to the fixed price the participant is required to buy at the fixed price. In this case, the participant can specify an additional amount to buy at the fixed price by entering it into the appropriate field of column 1212. If the participant's offer price is lower than the fixed price, the participant is required to sell at the fixed price. In this case, the participant can specify an additional amount to sell at the fixed price, by entering it into the appropriate field of column 1214. If the fixed price is between the participant's offer price and bid price, the participant can elect to either sell or buy an amount of credit derivative at the fixed price, but not both. Once the time limit has expired, all additional orders are processed by the system. The method of filling the orders is similar to that described in the volume clearing described above, except that a priority is assigned to those participants whose bids are closest to the fixed price.

FIG. 12C is a, screen shot illustrating the results of the volume clearing session. Columns 1216 and 1218 show the notional amount actually traded as a result of the trading activity described above. In this example, the participant's bid exceeded the fixed price so was obligated to buy 25 MM units of Europe, but also requested to buy an additional 50 MM units and successfully bought 75 MM units. The participant was not obligated to buy or sell HiVol, but requests to by 75 MM units of HiVol. However, this order was not matched. The participant's offer was lower than the fixed price for Crossover, so the participant was obligated to sell 10 MM units of Crossover. The participant also requested to sell another 40 MM units of Crossover, however, only a partial order of 20 MM units of Crossover was available leading to a total sale of 30 MM units.

Figure 13:
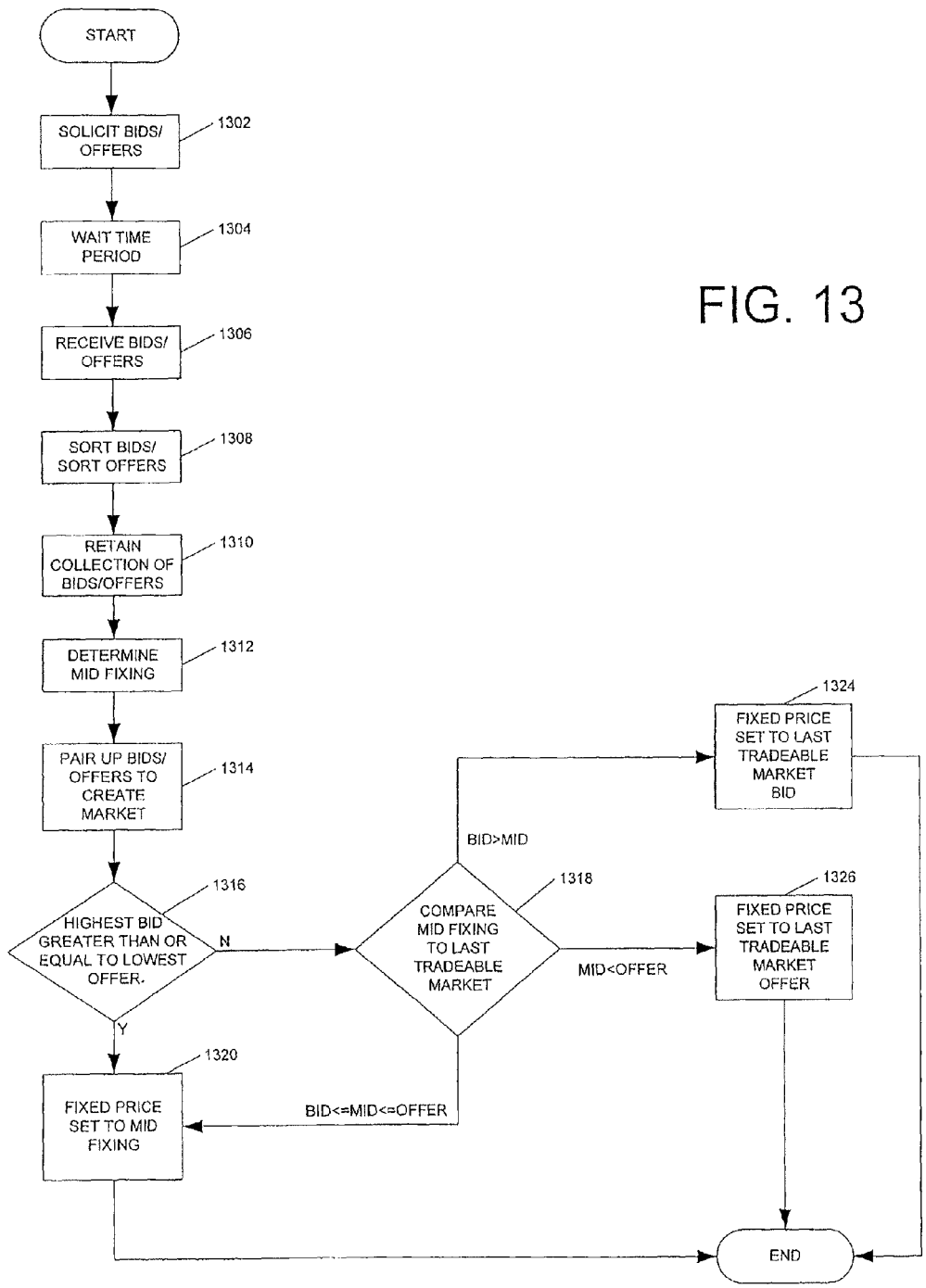
FIG. 13 is a flow chart depicting a method of determining the fixed price based on the bids and offers by the participants.

FIG. 13 is a flow chart depicting a method of determining the fixed price based on the bids and offers by the participants. At step 1302, the system solicits bids and offers from the participants. At step 1304, the system waits a predetermined period of time. At step 1306, the system collects all valid bids and offers from the participants. At step 1308, the bids are sorted into a sequence with the highest bids first and the offers are sorted into a sequence with the lowest offers first. At step 1310, all bids except for a predetermined number of the highest bids and all offers except for a predetermined number of the lowest offers are discarded. For example, the highest half of the bids and the lowest half of the offers are kept. At step 1312, the average is computed by averaging all the bid prices and offer prices. In other embodiments where the volume can be specified along with the bid and offer prices, the average can be computed by a simple average where each bid price and offer price is accounted for once or by a weighted average where each bid price and offer price is averaged in based on the volume specified by the participant. This average is called the mid fixing At step 1314, a sequence of markets is created by pairing the sequence of bids with their counterparts in the sequence of offers, so that the highest bid and the lowest offer comprise the first market in the sequence, where a market comprises a bid and an offer. At step 1316, a determination is made as to whether the highest bid exceeds the lowest offer. If not, the price is fixed at the average in step 1318. If so, at step 1320, the market with the lowest bid and the highest offer where the bid is at least the offer is determined. This market is referred to as the last tradeable market. At step 1322, a determination is made as to whether the average is below the bid of the last tradeable market, above the offer of the last tradeable market or between the bid and the offer. If the average is between the offer and the bid, then the price is fixed at the average in step 1318. If the average is below the bid, then the price is fixed at the bid of the last tradeable market at step 1324. If the average is above the offer, then the price is fixed at the offer of the last tradeable market at step 1326. Steps 1324 and 1326 are used to insure that a participant is not obligated to purchase at a price above his bid or to sell at a price below his offer.

Additionally, bid fixing and offer fixing can be used in determining the fixed price. The basic bid fixing calculation is to take the average of all bids which remain after step 1310. The basic offer fixing calculation is to take the average of all offers which remain after step 1310. The basic method can be adjusted so that if the bid fixing calculation exceeds the mid fixing the bid fixing is set to the mid fixing. Likewise, if the offer fixing calculation is below the mid fixing, the offer fixing is set to the mid fixing. Other methods can be used to calculate the bid fixing. The trades capped method takes all bids remaining after step 1310 and sets all bids greater than the mid fixing calculated in step 1312 to the mid fixing. After this all bids are averaged to generate the bid fixing. Similarly, all offers remaining after step 1310 are taken and all offers less than the mid fixing calculated in step 1312 are set to the mid fixing. After this, all offers are averaged to generate the offer fixing. The trades excluded method averages all bids remaining after step 1310 that are less than the mid fixing to generate the bid fixing. If no bids are below the mid fixing, the highest bid is taken as the bid fixing. Likewise, all offers remaining after step 1310 that are greater than the mid fixing are averaged to generated the offer fixing. If no offers are greater than the mid fixing, the lowest offer is taken as the offer fixing. In the examples shown, the mid fixing is used as the fixed price for the volume clearing, however, the bid fixing and offer fixing can be used as a reference in future contracts as well as incorporated into the calculation of the fixed price in this or future sessions.

Figure 14:
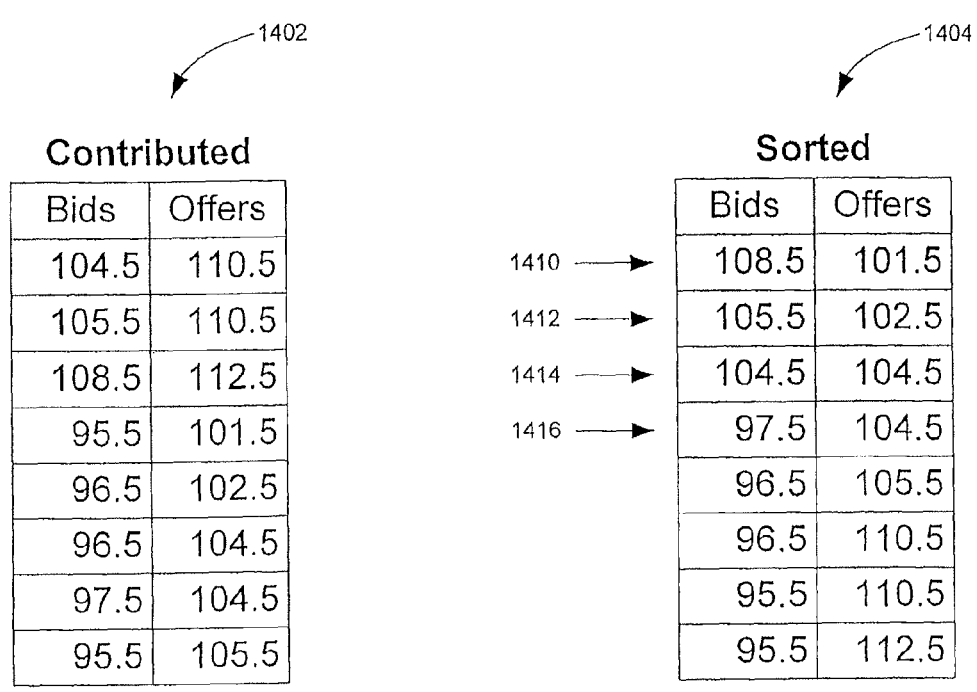
FIG. 14 are two tables illustrating the method described above.

FIG. 14 are two tables illustrating the method described above. In table 1402, the contributed bids and offers of eight participants are shown. In table 1404, the bids and offers are sorted with highest bids and lowest offers first. In accordance with step 1310, only the top four pairs are kept so, only rows 1410, 1412, 1414, and 1416 are kept in the mid fixing calculation. Finally, rows 1410, 1412, and 1414 show bids that are greater than or equal to the offers. Row 1414 having the lowest bid and highest offer among this group making row 1414 the last tradeable market.

Figure 15B:
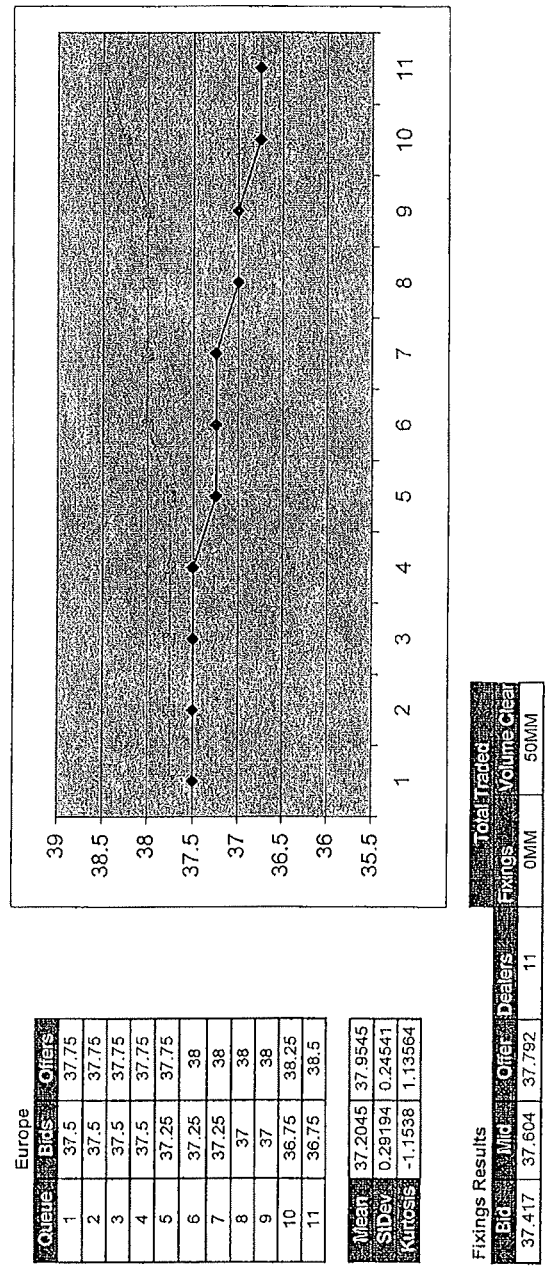
Figure 15C:
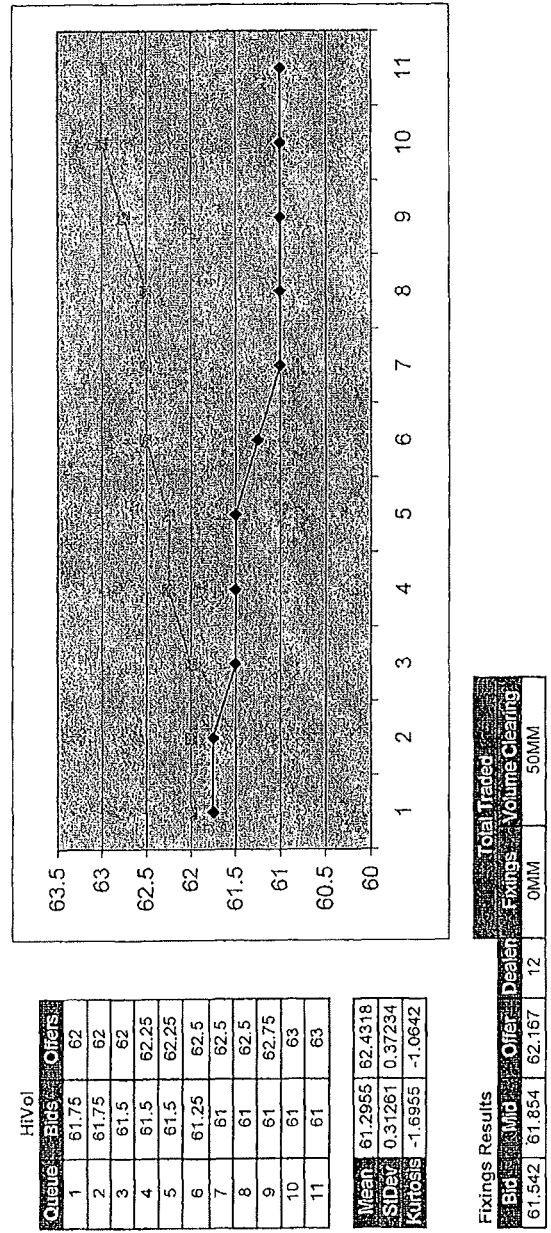
Figure 15D:
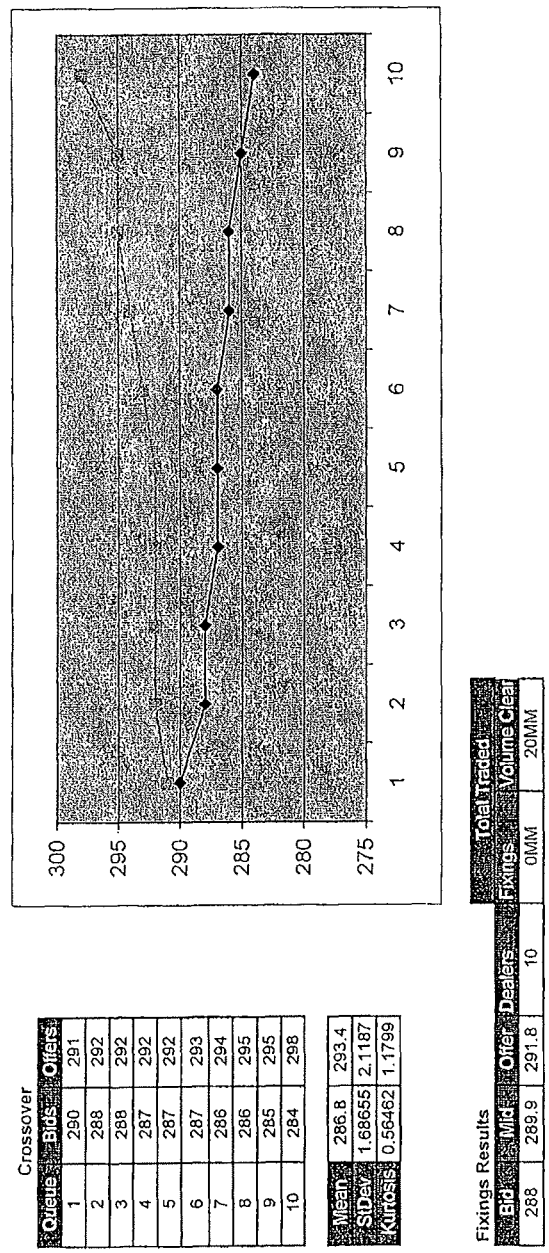

FIG. 15A is a summary print out of an actual fixed price trading session. The table on the left shows the bid, mid and offer fixing for three credit derivatives involved. On the right are three tables showing the bid prices and the offer prices for the three credit derivatives sorted by highest bid and lowest offer. In this example in calculating the bid, mid, and offer fixings the first half of the offers and bids are retained. FIG. 15B is a print out of detailed results of the Europe credit index, showing the same bids and offers as the right side of FIG. 15A, but also with statistical quantities such as the mean, standard deviations, and kurtosis, and a graph of the markets, graphed in the order displayed in the table. FIG. 15C is a print out of detailed results of the HiVol credit derivative, showing similar categories of results as in FIG. 15B. FIG. 15D is a print out of detailed results of the Crossover credit derivative, showing similar categories of results as in FIG. 15B.

As mentioned above, system 100 comprises a standardized interface configured to make transacting in system 100 quick and efficient. Thus, the standardized interface allows each of the trader clients to interface with credit derivative authority 102 and view information on a plurality of credit derivatives that is displayed in a compact and uniform format. Example formats were described above, e.g., in relation to FIG. 5. As was also described, the standardized interface allows each of the trader clients to customize the trader client's view of the information displayed for the plurality of credit derivatives. This was explained, e.g., in relation to FIG. 6. Thus, the display of information can be customized using the standardized interfaced based any of the following: region, industry, a reference entity name, a credit duration, a debt level, a spread, a restructuring level, an ask price, and a credit rating.

In another embodiment, when there is sufficient activity in a particular credit derivative as determined either by the system or by the participants, the system can facilitate volume clearing of credit derivatives based on the most recently traded price. In overview, once the credit derivative has been traded, invited participants are invited to trade their credit derivatives during a set time interval. Those who desire to participate indicate the notional amount they desire to buy or sell. Once the time limit expires, the system determines which participants can trade and which buyers actually trade with which sellers, by matching similar trade amounts.

Figure 9:
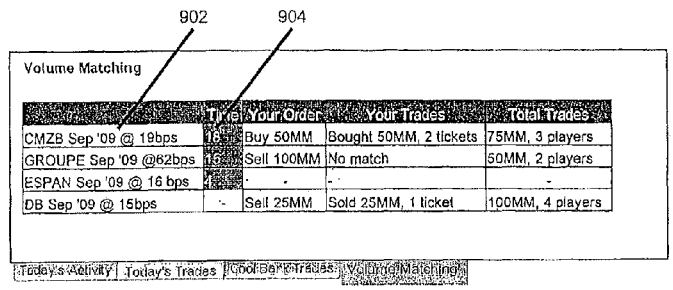
FIG. 9 is a screen shot illustrating an example method for displaying trade information that includes an option for volume upsizing in accordance with one embodiment.

More specifically, when a trade is completed the price can be offered to invited participants by listing the trade in a "Volume Clearing" display. FIG. 9 is a screen shot of an example of a Volume Clearing display showing credit derivatives that the participant can trade. Column 902 represents the credit derivative to be traded and the price. Column 904 shows the time remaining to trade that credit derivative at that price. For example, in the first row, the credit derivative Cornrnerzbank (CMZB) is available for trading at a price of 19 basis points (bps) for the next 18 seconds. Participants are invited based on criteria which is indicative of their desire to trade that credit derivative, such as placement of a bid in the trade current session or placement of a bid in a recent trade session involving the trade derivative.

Figure 16:
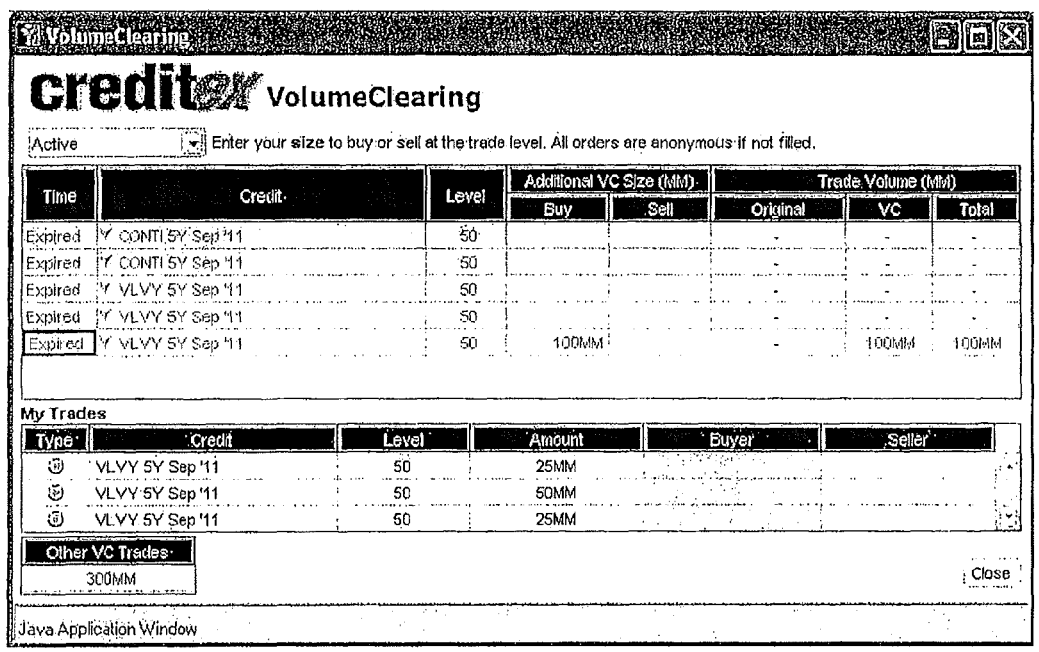
FIG. 16 is a screen shot of a participant display following a volume clearing trade.
Figure 17:
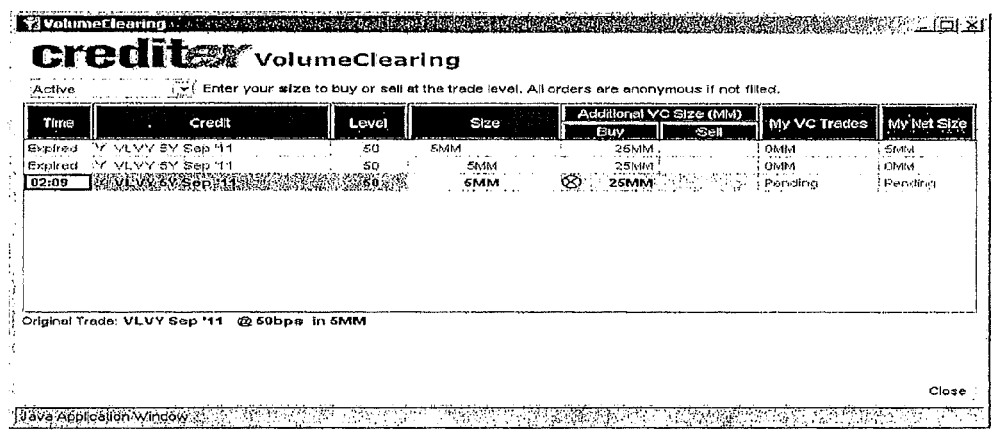
FIG. 17 is a screen shot of a participant display in which a participant is given the opportunity to make a volume clearing trade.

FIGS. 16 and 17 show additional views of a Volume Clearing display. FIG. 16 shows a view of a participant display following a Volume Clearing trade. FIG. 17 shows a view of a participant display in which a participant is given the opportunity to make a volume clearing trade.

Figure 10:
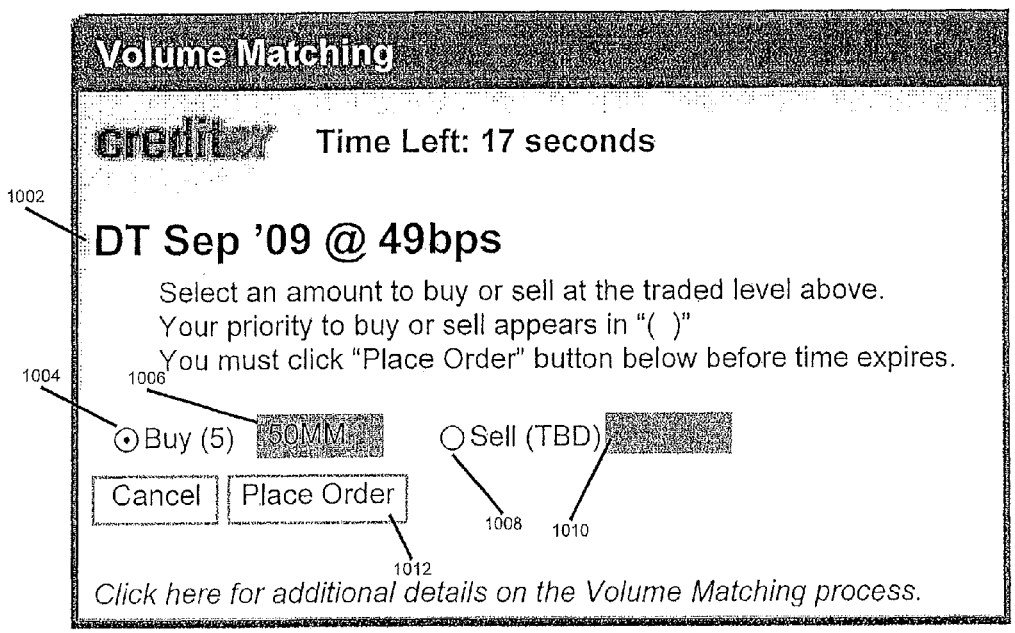
FIG. 10 is an example screen shot of a display that can be used to implement volume upsizing.

FIG. 10 is a screen shot of an example of a method by which an interested participant can participate in volume clearing. Field 1002 shows the credit derivative and the price it is being traded at. The participant can select button 1004 and enter a notional amount into field 1006 that he desires to buy the credit derivative or alternatively the participant can select button 1008 and enter a notional amount into field 1010 that he desires to sell. The order is then placed by clicking on field 1012.

After the set time interval has expired, the orders can be filled according to the priority of the participant. The participant can be assigned a priority in the following order: the highest priority goes to current participants in the trade, the next highest priority goes to participants who are in the buyer or seller priority queues at the time of the trade, and finally, the remaining participants are prioritized on a first come first serve basis.

Depth means that the participant had a price in the queue during the original trade. For example, if the credit derivative traded onscreen at 20 prior to the volume clearing session, and the participant was in the queue with the next-best bid of 19, they may be given priority based on. Because you had a price on the screen, you were given priority regardless of your VC ranking.

The orders are then matched to optimize as much as possible orders of the same size of the counterparties. By doing so, the number of trade tickets generated is minimized. Once the matching is completed a trade ticket is generated and each transaction can be completed similar to the manner described above for a single trade.

FIG. 11 is a table showing an example of how the trade matching works. In table 1102, there are four buyers and three sellers with their respective orders listed in the order of their priority. In matching table 1104, buyer 1 is matched with seller 3 because their notional amounts match. Furthermore, buyer 2 is matched with seller 1 because their notional amounts match. Since remaining orders no longer match, the orders can be split. Buyer 3 having priority over buyer 4 is matched with seller 2. Since seller 2's order is larger than buyer 3's order, the remaining notional amount of seller 2 is available to buyer 4.

Another method of assigning priority to traders during a volume clearing session is to assign the highest priority to the original buyer and original seller, the next highest priority is assigned to the original buyer and original seller if they change sides (i.e. I bought on the original trade that caused a volume clearing to occur and I wish to sell during the volume clearing), the next highest priority is then assigned based on the participant's ranking based on the participants price support rank and depth rank.

Price support can be calculated as follows: 1) Take the sum of all valid price support hours for each participant, for example in the last 30 trading days. Valid price support hours is the number of hours for which prices are displayed on the platform. Prices are considered valid if a bid is within a pre-determined threshold of the best offer of the day, and if an offer is within a pre-determined threshold of the best bid of the day. 2) Rank all participants from best to worst. 3) Score the best as 1, second best as 2, and continue until all Market Participants have been ranked.

Depth is a ranking based on which participants are in the buyer or seller priority queues at the time of the trade. For example, the next buyer in the queue with the next best price at the time of the trade can be assigned a ranking of 1. A priority can be based on prices support or depth. Alternatively, a priority can be based on the participant's price support and depth, for example, 50% on price support and 50% on depth.

Priority can also be assigned according to yet another methodology, which benefits participants that may trade a lot on the platform but may not get credit for as much price support under the previously described mythology. According to this methodology the highest priority to the original buyer and original seller, the next highest priority is assigned to the original buyer and original seller if they change sides (i.e. I bought on the original trade that caused a volume clearing to occur and I wish to sell during the volume clearing), the next highest priority is then assigned based on the participants ranking based on the participant's notional rank and price support rank.

The notional ranking can be calculated by summing the number of trades of a standard size in a given sector for the last 30 calendar days. More specifically, the calculation can be based on the number of "clips" of market standard size that have traded. Market standard size is defined by platform and is the most common size that people will post prices onto the platform.

Examples of standard market sizes may include for example: TABLE-US-00001 iTraxx Europe & HiVol EUR 25 MM iTraxx Crossover EUR 10 MM European Financials EUR 10 MM European Single Names EUR 5 MM.

For example, if a participant trades 500 MM iTraxx Europe in the last 30 days, and 80 MM iTraxx Crossover, both credits count towards the ranking for European Indices for volume clearing. However, the data is normalized before being counted (otherwise there is an incentive advantage towards trading Europe vs Crossover as far as the ranking calculation is concerned). The data is normalized by dividing by the standard market size for each trade. For Example: 500/25=20 80/10=8

Therefore, the platform counts 28 clips of standard market size traded for this participant. This calculation is performed for all the counterparties and then counterparties are ranked according to the results.

Large magnitude trades can be rewarded with a higher notional value than other trades. For example, any tickets that are >=4.times.Market Standard Size (ie EUR 20 MM on European Single Names and EUR 100 MM on iTraxx Europe) can count double. In the previous example of trading 500 MM Europe, if a participant executed 1 trade of 100 MM on the platform during this period the calculation would be as follows: 400/25=16 100*2/25=8 80/10=8

Therefore the system will count 32 clips of standard market size traded for this participant.

Indices, for example European indices have many different (old) series that may not be current. iTraxx Europe for example has 5 series (or versions) available. Preferably, the notional ranking calculation is split into one ranking for the current series (series 5 in Europe) and a ranking across all other series (i.e. sum of notional traded across all the other 4 series).

The price support ranking does not change from the previously described methodology. To obtain an overall ranking the notional and price support rankings for each participant are average. The participants are then re-ranked according to these new figures. Any ties can be broken by looking first at the notional rank and then the price support rank. For example: TABLE-US-00002 Notional Price Support Overall Bank A 5 7 6 Bank B 7 5 6

In the above example both banks have a final rank of 6. In the final calculation bank A can be ranked 6 and Bank B ranked 7 because Bank A has a higher ranking in the notional ranking.

The system can also allow for the identification of large ticket clients. By providing identified participants large ticket client status, participants who execute larger ticket sizes on the trading platform can be rewarded.

The identification of a large ticket client can be accomplished by checking the number of large ticket trades executed over the last 30 days. A large ticket trade can be defined as being X times the market standard size, for example, 4 times market standard size. If a client executes more than, for example, 10 such trades in the last 30 calendar days, then this client can be designated a "Large Ticket Client".

Having "Large Ticket Client" status can gain a participant access to functionality on the system that is not generally available.

For the purposes of this calculation, a ticket of Standard Market Size that is increased as a result of volume clearing trades to 4.times.standard market size can count towards the total.

Tickets that are upsized as a result of merging two tickets (eg I trade 2.times.Market Standard Size of a credit in the morning, and then do the same trade with the same counterparty in the afternoon and ask for the tickets to be combined— creating one ticket of 4.times.Market Standard Size) will preferably not count toward large ticket status.

Preferably separate markets are only available in at least 4.times.Standard Market Size to clients that obtain large client ticket status.

These markets may not display size. Instead, these prices can just automatically work in 4.times.market standard size. Participants can post more than 4.times.market size and the excess can automatically be posted to volume clearing.

Trade reporting and volume clearing for these markets may only be available to those users who have access to the market.

Access to the large ticket markets may be limited to those clients currently holding "Large Ticket" status. All other clients preferably may be able to see the credit on the screen, but no prices, no depth, no volume clearing and no trade reporting. FIG. 18 shows an example of participant screen for a participant who has large ticket status and an example of a participant screen for a participant who does not have large ticket status.

Clients that do not have large ticket status may be able to place a price into the market, and if it is considered to be a good price, the user may have access for the duration of the price being on the screen. The system can monitor the time that a price is placed to ensure that dealers are not encouraged to quickly place a price on the screen and then remove it as soon as they have checked what pricing is currently in the big ticket market. Using the system in this manner can automatically result in the client being blocked from having access in this manner, for example, after 3 consecutive such actions.

Preferably, these markets are shown in a separate display group. This methodology is unique both in the way that the markets are separated by pricing and size, and by the methodology that that allows people to gain access to the feature.

The system may also reward participants who have the current best offer or best bid by giving these participants a "first look." The first look replicates a certain amount of the current voice broker "Engagement Rules". The Current Best Bid/Offer gets, for example, a 5 second opportunity to execute a new counter price. For example, if a participant has a 35 bid on screen and there is no offer and another dealer enters a 40 offer onto the screen, all the market participants see the 40 offer, but for the 5 seconds after the 40 offer is posted, only the user that posted the 35 bid may be able to execute the trade. During this period no users other than the 35 bid and the 40 offer will be able to trade either on the best prices, or the depth.

Figure 19:
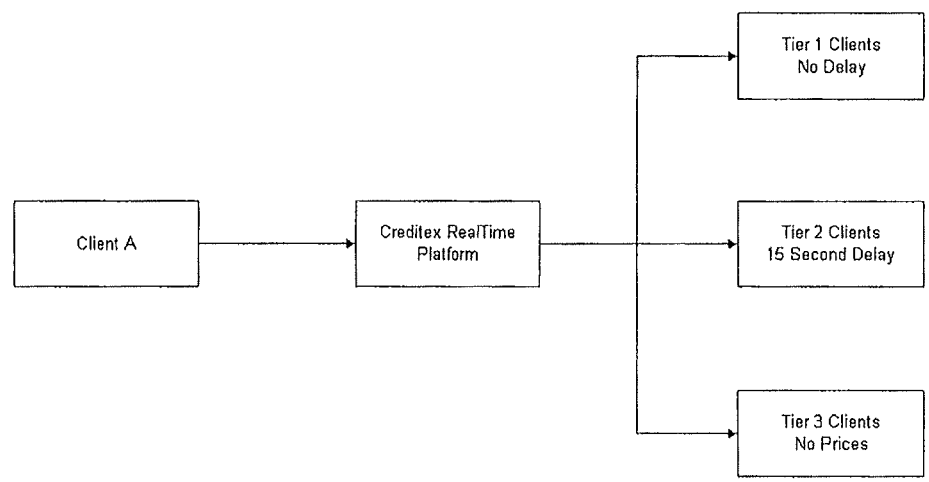
FIG. 19 is block diagram showing three different price feed tiers.

The system may also provide tiered price feeds. Tiered price feeds allow dealers to select institutions on the platform and choose to show them their prices different ways. FIG. 19 is block diagram showing three different price feed tiers. In FIG. 19:

Tier 1 is immediate pricing—The participant posts a price and a user with Tier 1 pricing sees it immediately.

Tier 2 is delayed pricing—The participant posts a price and dealers with Tier 2 access to the participant's pricing sees the price 15 seconds after I post it. In the event a trade happens during the 15 second delay period, those with Tier 2 access to the participant's pricing will see that a trade has occurred and that volume clearing has begun, without any delay.

Tier 3 is no pricing. Users with no access to a participant's prices may still see trade reports and volume clearing when a trade occurs, even if they cannot see either price involved in the trade.

The standardized interface is further configured to allow each of trader clients to define credit derivative positions online and to update them quickly and efficiently. For example, in one embodiment, a trader client simply inputs the information that defines the credit derivative and their position, e.g., bid or ask price, and then updates the position with credit derivative authority 102 with a single "click". The term "click" is intended to indicate that the user simply needs to use an input device, such as a mouse, to select text, a button, or an icon. Moreover, the trader can use this simple process to update a position anytime, and all of the other trader clients will be updated automatically in real-time.

The standardized interface, in certain embodiments, is also configured to allow the trader clients to, at anytime, render inactive all or some of the trader clients defined positions with a single click. Trader clients can also reactivate some or all of their inactive positions using a single click, whenever they decide to do so. The other trader clients are then automatically updated, based on the deactivation and reactivation of positions, in real-time.

In certain embodiments, credit derivative authority 102 is configured to facilitate communication with trader clients via their terminals 108. This communication can be between trader clients, i.e., between terminals 108, and/or between trader clients and credit derivative authority 102, i.e., between terminals 108 and credit derivative authority 102. Thus, the standardized interface includes an electronic messaging tool, such as email or instant messaging. The trade clients input and send messages using the electronic messaging tool. The messages are received by credit derivative authority 102 and forwarded to the correct terminal 108, when required. The messaging capability is used for example, to facilitate negotiations and/or settlement of transactions between trader clients. Thus, in some instances the messages are between terminals 108 and include negotiation information. In other instances, the messages are between credit derivative authority 102 and a terminal 108 and include settlement information.

Figure 7:
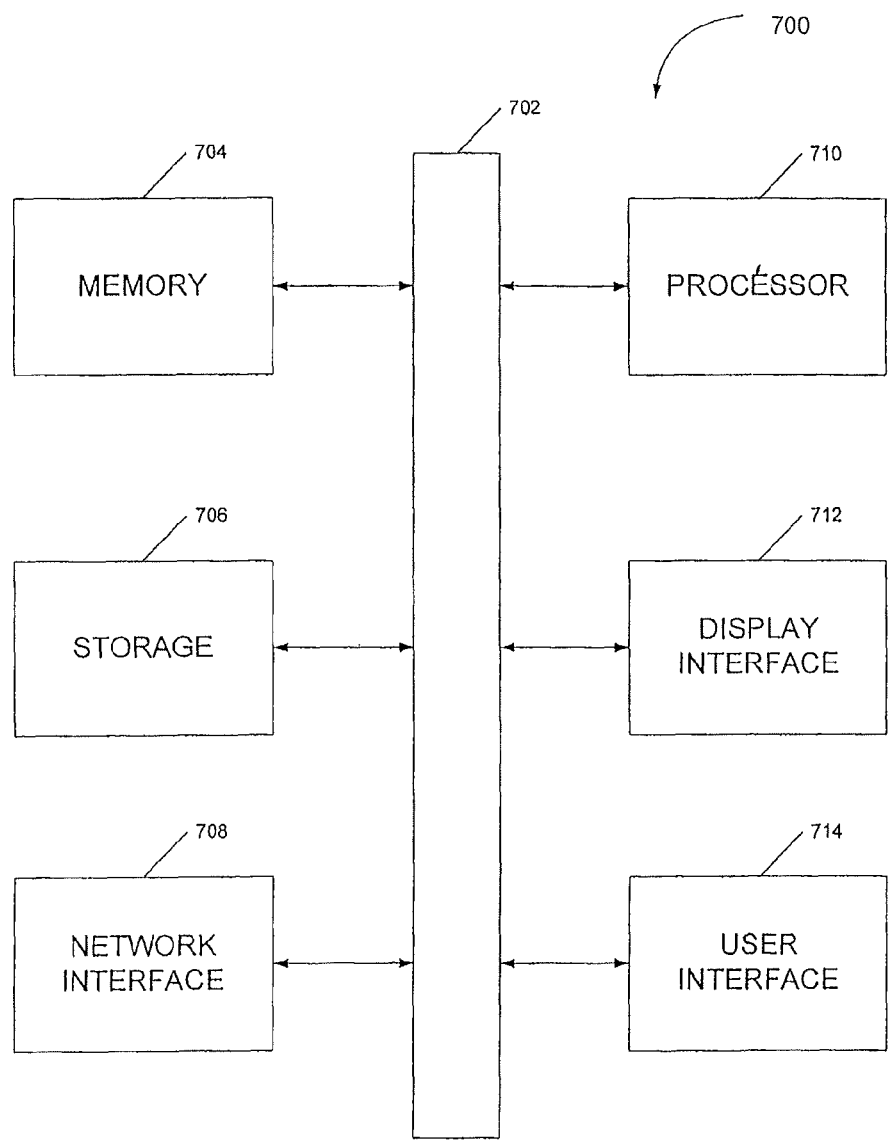
FIG. 7 is a logical block diagram illustrating an exemplary computer system that can be included in the system of FIG. 1.

FIG. 7 is a logical block diagram illustrating an example embodiment of a computer system 700 that is, for example, included in the computer system that comprises credit derivative authority 102. As will be understood, some type of processing system is always at the heart of any computer system, whether the processing system includes one or several processors included in one or several devices. Thus, computer system 700 of FIG. 7 is presented as a simple example of a processing system. In the example of FIG. 7, computer system 700 comprises a processor 710 configured to control the operation of computer system 700, memory 704, storage 706, a network interface 708, a display output 712, a user interface 714, and a bus 702 configured to interface the various components comprising computer system 700.

Processor 710, in one embodiment, comprises a plurality of processing circuits, such as math coprocessor, network processors, digital signal processors, audio processors, etc. These various circuits can, depending on the embodiment, be included in a single device or multiple devices. Processor 710 also comprise an execution area into which instructions stored in memory 704 are loaded and executed by processor 710 in order to control the operation of computer system 700. Thus, for example, by executing instructions stored in memory 704, processor 710 causes credit derivative authority 102 to execute the steps described above.

Memory 704 comprises a main memory configured to store the instructions just referred to. In one embodiment, memory 704 also comprise secondary memory used to temporarily store instructions or to store information input into computer system 700, i.e., memory 704 acts as scratch memory also. Memory 704 can comprises, depending on the embodiment, a plurality of memory circuits, which can be included as a single device, or as a plurality of devices.

Storage 706 includes, in certain embodiments, a plurality of drives configured to receive various electronic media. For example, in one embodiment, storage 706 includes a floppy drive configured to receive a floppy disk, a compact disk drive configured to receive a compact disk, and/or a digital video disk drive configured to receive a digital video disk. In another embodiment, storage 706 also includes disk drives, which can include removable disk drives. The drives included in storage 706 are used to receive electronic media that has stored thereon instructions to be loaded into memory 704 and used by processor 710 to control the operation of computer system 700.

Network interface 708 is configured to allow computer system 700 to interface with, and communicate over, network 106. Thus, using a network interface, such as network interface 708, credit derivative authority 102 is able to communicate with terminals 108. Depending on the embodiment, credit derivative authority 102 includes one or multiple network interfaces 708.

Display interface 712 can be configured to allow computer system 700 to interface with a display. Thus, in certain embodiments, computer, system 700 displays information to a user via display interface 712.

User interface 714 is configured to allow a user to interface with computer system 700. Thus, depending on the embodiment, user interface 714 can include a mouse interface, a keyboard interface, an audio interface, etc.

It should be clear that the general description of a computer system provided above is by way of example only and should not be seen to limit implementation of credit derivative authority 102 to any particular computer architecture or implementation. Rather any architecture or implementation capable of implementing the processes and functionality described above can be used to implement the systems and methods described herein.

While certain embodiments of the inventions have been described above, it will be understood that the embodiments described are by way of example only. Accordingly, the inventions should not be limited based on the described embodiments. Rather, the scope of the inventions described herein should only be limited in light of the claims that follow when taken in conjunction with the above description and accompanying drawings.

The invention claimed is:

1. A method of executing additional trades on a trading platform at a previously executed price comprising:
   setting, via a computing device, a price of a security at a price at which an original buyer and original seller executed a trade;
   ranking, via said computing device, participants for engaging in additional trades at the set price, wherein the ranking is at least partially determined by summing a quantity of clips each of said participants has traded on the platform in a given period, wherein for at least one participant said quantity of clips represents at least two different securities, and wherein said participants are not limited to the original buyer and original seller; and
   executing the additional trades at the set price based on the ranking,
   wherein said clips each comprises a total number of traded shares divided by a normalizing quantity, wherein said normalizing quantity is determined by the platform, and wherein a normalizing quantity determined for a first security varies from a normalizing quantity determined for at least one second security.

2. The method of claim 1, further comprising assigning the highest priority to the original buyer and the original seller.

3. The method of claim 1, wherein the security comprises credit derivatives.

4. The method of claim 1, wherein the ranking is based on a combination of the sum of clips each of said participants has traded on the platform in the given period and how often each participant's bids or offers for a given security were within a given price range.

5. The method of claim 4, wherein the given price range is a range within a pre-determined threshold of a best offer or best bid of the day as of the time of ranking.

6. The method of claim 1, further comprising ranking the additional participants based on the participants ranking in a trade queue at the time that the original buyer and original seller executed the trade.

7. The method of claim 1, further comprising ranking the participants based on how many large trades of a specific large number of shares they have completed on the platform in a given period, said large number of shares equaling two or more times the specific number of shares.

8. The method of claim 1, wherein the given period is 30 days.

\* \* \* \* \*